(12) United States Patent
Masuda

(10) Patent No.: US 9,810,832 B2
(45) Date of Patent: Nov. 7, 2017

(54) ILLUMINATION DEVICE, DISPLAY DEVICE, AND TELEVISION RECEIVING DEVICE

(71) Applicant: Sharp Kabushiki Kaisha, Osaka (JP)

(72) Inventor: Yusuke Masuda, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 13 days.

(21) Appl. No.: 14/901,708

(22) PCT Filed: Jun. 24, 2014

(86) PCT No.: PCT/JP2014/066632
§ 371 (c)(1),
(2) Date: Dec. 28, 2015

(87) PCT Pub. No.: WO2015/002017
PCT Pub. Date: Jan. 8, 2015

(65) Prior Publication Data
US 2016/0282549 A1 Sep. 29, 2016

(30) Foreign Application Priority Data
Jul. 1, 2013 (JP) .................................. 2013-138102

(51) Int. Cl.
*G02F 1/1333* (2006.01)
*F21V 8/00* (2006.01)
(Continued)

(52) U.S. Cl.
CPC .......... *G02B 6/0088* (2013.01); *G02B 6/005* (2013.01); *G02B 6/0085* (2013.01); *G02F 1/133308* (2013.01); *G02F 1/133615* (2013.01); *G02F 2001/133317* (2013.01); *G02F 2001/133322* (2013.01); *G02F 2001/133328* (2013.01); *H04N 5/645* (2013.01)

(58) Field of Classification Search
None
See application file for complete search history.

(56) References Cited

U.S. PATENT DOCUMENTS

2002/0080298 A1* 6/2002 Fukayama ........ G02F 1/133308
349/58
2005/0099554 A1* 5/2005 Hayano ............ G02F 1/133308
349/58
(Continued)

FOREIGN PATENT DOCUMENTS

JP 2004-053682 A 2/2004
JP 2007-188029 A 7/2007
(Continued)

*Primary Examiner* — Ryan Crockett
(74) *Attorney, Agent, or Firm* — Chen Yoshimura LLP

(57) ABSTRACT

An illumination device includes: a light source; an optical sheet having a rectangular shape and imparting an optical effect on light from the light source; a display component having a rectangular shape and being provided on the optical sheet; and a frame member having a frame shape surrounding the optical sheet and, on at least one edge of the optical sheet, selectively and directly or indirectly pressing an area that is located relatively more towards a center of the edge of the optical sheet than both sides of the edge so as to secure said area to the display component.

13 Claims, 27 Drawing Sheets

(51) Int. Cl.
*H04N 5/645* (2006.01)
*G02F 1/1335* (2006.01)

(56) References Cited

U.S. PATENT DOCUMENTS

| | | | | |
|---|---|---|---|---|
| 2009/0244432 A1* | 10/2009 | Hattori | G02B 6/0088 | 349/58 |
| 2010/0045888 A1* | 2/2010 | Naritomi | G02F 1/133608 | 349/58 |
| 2010/0220256 A1* | 9/2010 | Hong | G02B 6/0088 | 349/58 |
| 2012/0257107 A1* | 10/2012 | Itoh | G02B 6/0085 | 348/553 |
| 2014/0104773 A1* | 4/2014 | Ito | G06F 1/1601 | 361/679.21 |
| 2014/0233203 A1* | 8/2014 | Ohtomo | G02F 1/133308 | 361/809 |

FOREIGN PATENT DOCUMENTS

| | | |
|---|---|---|
| JP | 2009-259781 A | 11/2009 |
| WO | 2013/069592 A1 | 5/2013 |

\* cited by examiner

ILLUMINATION DEVICE, DISPLAY DEVICE, AND TELEVISION RECEIVING DEVICE

TECHNICAL FIELD

The present invention relates to an illumination device, a display device, and a television receiver.

BACKGROUND ART

A liquid crystal display device such as a liquid crystal television requires a separate backlight device as an illumination device since the display panel, which is a liquid crystal panel, does not emit light on its own, for example. This type of backlight device is largely categorized into direct-lit and edge-lit, depending on the configuration thereof. In either the direct-lit or edge-lit backlight device, optical sheets that impart optical effects (such as to make light planar) on light emitted from the light source are provided on the display surface side.

In backlight devices provided with these types of optical sheets, if vibrations or the like cause the optical sheets to deviate in position, then the optical sheets may rub against laminated members such as the liquid crystal panel, which could damage these laminated members. As a countermeasure, in backlight devices having optical sheets, a holding member is sometimes provided to hold at least part of the edge of the optical sheets to a casing such as a chassis in order to prevent or suppress positional deviations of the optical sheets. An example of this type of holding member that holds the optical sheets in the backlight device is described in Patent Document 1, for example.

RELATED ART DOCUMENT

Patent Document

Patent Document 1: Japanese Patent Application Laid-Open Publication No. 2007-188029.

Problems to be Solved by the Invention

The holding member described in Patent Document 1, however, is attached to the chassis, which is the casing, and holds the edges of the optical sheets with no gaps therebetween, thereby securing the optical sheets to the chassis. Therefore, it is difficult for the optical sheets to expand or contract, and if the optical sheets deflect due to heat or the like, it will not be possible to eliminate this deflection, which could form wrinkles in the optical sheets.

SUMMARY OF THE INVENTION

The technology disclosed in the present specification was made in view of the above-mentioned problems. The present specification aims at providing a technology whereby it is possible to prevent or suppress wrinkling of the optical sheets while preventing or suppressing positional deviation of the optical sheets.

Means for Solving the Problems

The technology described in the present specification is directed to an illumination device, including: a light source; an optical sheet having a rectangular shape and imparting an optical effect on light from the light source; a display component having a rectangular shape and being provided on the optical sheet; and a frame member having a frame shape surrounding the optical sheet and, on at least one edge of the optical sheet, selectively and directly or indirectly pressing an area that is located relatively more towards a center of the edge of the optical sheet than both sides of the edge so as to secure the area to the display component.

In the above-mentioned illumination device, on at least one edge of the optical sheets, an area more towards the center than the edges is selectively sandwiched between the laminated member (optical component) and the frame member. Due to this, at least one edge of the optical sheets is held at the area being sandwiched, which can prevent or suppress optical deviations of the optical sheets. Meanwhile, on the edge of the optical sheets, the area other than the area being sandwiched is not sandwiched or held between the laminated member and the frame member. Therefore, deflections that occur in the center of the surface of the optical sheets and the center of the edge of the optical sheets can be eliminated at the areas that are not held, or namely, the areas on both ends of the edge of the optical sheets, thereby preventing or suppressing wrinkling of the optical sheets. As described above, in the illumination device, it is possible to prevent or suppress wrinkling of the optical sheets while preventing or suppressing positional deviations of the optical sheets.

Only the at least one edge of the optical sheet need be held to the display component.

With this configuration, on the surface of the optical sheets, deflection of the optical sheets can be eliminated at all areas other than the area on the edge being sandwiched between the laminated member and frame member; thus, it can be made easy to eliminate deflections that occur on the sheet surface.

The frame member may have an engaging section formed on a portion thereon, and the illumination device may further include an engaging member that fits into the engaging section so as to secure, to the engaging section, a part of an area on the edge of the optical sheet that is outside the area where the optical sheet is secured to the display component.

With this configuration, on the edge of the optical sheets, a part of an area located outside the area being sandwiched between the laminated member and the frame member can be sandwiched and held between the engaging section and the engaging member of the frame member. Therefore, the optical sheets can be effectively held, and positional deviations of the optical sheets can be further prevented or suppressed.

The engaging section may protrude from the frame member toward the optical sheet, and the optical sheet may have at least one opening in the area of the edge of the optical sheet that is outside the area where the optical sheet is secured to the display component by the frame member, the engaging section penetrating through the opening in the optical sheet.

With this configuration, the edges of the opening abut the peripheral surface of the engaging section while the engaging section is inserted inside the hole in the optical sheets, thereby making it possible to position the optical sheets in the surface direction with respect to the frame member.

The optical sheet may include a sheet extending portion that extends outward from the edge of the optical sheet, and the opening in the optical sheet may be located in the sheet extending portion.

With this configuration, both sides of the area of the frame member overlapping the sheet extending portion do not overlap the optical sheets; thus, it is possible to provide a structure such as side walls at the areas on the frame member that do not overlap. Therefore, it is possible to make the frame region of the illumination device narrower as compared to if a structure such as side walls of the frame member were being provided further outside the areas of the frame member overlapping the sheet extending portions.

The engaging member may have a protrusion and the engaging section may have a recess to receive the protrusion.

With this configuration, the engaging member is inserted into the hole to penetrate the engaging section and the peripheral surface of the engaging section positions the optical sheets in the sheet surface direction, and in this state the engaging member can engage the engaging section. Therefore, it is easy to make the engaging member engage the engaging section.

The frame member may further include a claw-shaped locking part formed on a portion thereof, the locking part protruding from the frame member towards the optical sheet, and there may be a plurality of the openings in the optical sheet, the openings being respectively provided in the center and the both sides on the edge of the optical sheet, and, among the openings in the optical sheet, the opening provided in areas respectively closer to the both sides than the center on the edge of the optical sheet may have the locking part of the frame member penetrating therethrough, thereby locking the optical sheet to the locking part such that the optical sheet is slidable in a thickness direction thereof.

With this configuration, the edges of the openings abut the peripheral surface of the locking parts while the locking parts are inserted into the openings in the frame member, thereby positioning the optical sheets in the sheet surface direction with respect to the frame member. Moreover, the locking parts being inserted into the openings locks the optical sheets such that the optical sheets can slide in the thickness direction thereof, which allows the optical sheets to deflect in the areas that are locked, thereby making it possible to eliminate these deflections. In this manner, at the areas locked by the locking parts on the edge of the optical sheets, it is possible to eliminate deflections of the optical sheets while positioning the optical sheets.

The illumination device may further include a heat-dissipating member disposed between the frame member and the light source, the heat-dissipating member supporting the light source.

With this configuration, a large portion of the heat generated by the light source is transmitted to the heat-dissipating member disposed on a side opposite to the frame member that presses the optical sheets to the laminated member; thus, it is possible to prevent the heat from being transmitted to the optical sheets. This allows for deflections of the optical sheets caused by heat to be suppressed.

The illumination device may further include a chassis including at least a plate-shaped portion along a sheet surface of the optical sheet, and a bent portion that bends from a periphery of the plate-shaped portion towards the heat-dissipating member to abut a part of the heat-dissipating member.

With this configuration, a portion of the heat-dissipating member abutting the bent portion makes it possible to position the heat-dissipating member in the surface direction of the plate-shaped member of the chassis. Moreover, a portion of the heat generated by the light source is transmitted to the heat-dissipating member via the chassis, which makes it possible to further suppress heat being transmitted to the optical sheets.

The frame member may be made of a resin.

With this configuration, it is possible to make it harder for heat to be transferred to the optical sheets via the frame member as compared to if the frame member were made of metal.

The technology described in the present specification can be expressed as a display device including: the illumination device, and the optical component may be a display panel that performs display using light from the illumination device.

With this configuration, in the display device having the optical sheets between the display panel and the frame member, it is possible to prevent or suppress wrinkling of the optical sheets while preventing or suppressing positional deviations of the optical sheets.

In the present invention, a display device may include: the illumination device, and the optical component may be a light guide plate that has a light-entering face on at least one end face thereof and that guides light from the light source that has entered the light-entering face to the optical sheet, and the display device may additionally include a display panel provided on the optical sheets, the frame member pressing the area through the display panel.

With this configuration, in the display device having the edge-lit illumination device with optical sheets between the light guide plate and the frame member, it is possible to prevent or suppress wrinkling of the optical sheets while preventing or suppressing positional deviations of the optical sheets.

A display device that uses the liquid crystal panel having liquid crystal as the display panel is novel and useful. A television receiver that includes the display device is also novel and useful.

Effects of the Invention

The technology described in the present specification makes it possible to prevent or suppress wrinkling of the optical sheets while preventing or suppressing positional deviations of the optical sheets.

DETAILED DESCRIPTION OF EMBODIMENTS

Embodiment 1

Embodiment 1 is described with reference to the drawings. In the present embodiment, a liquid crystal display device (one example of a display device) 10 is described as an example. Each of the drawings indicates an X axis, a Y axis, and a Z axis in a portion of the drawings, and each of the axes indicates the same direction for the respective drawings. The Y axis direction corresponds to the vertical direction, and the X axis direction corresponds to the horizontal direction. Unless otherwise noted, "up" and "down" in the description is based on the vertical direction.

Figure 1:
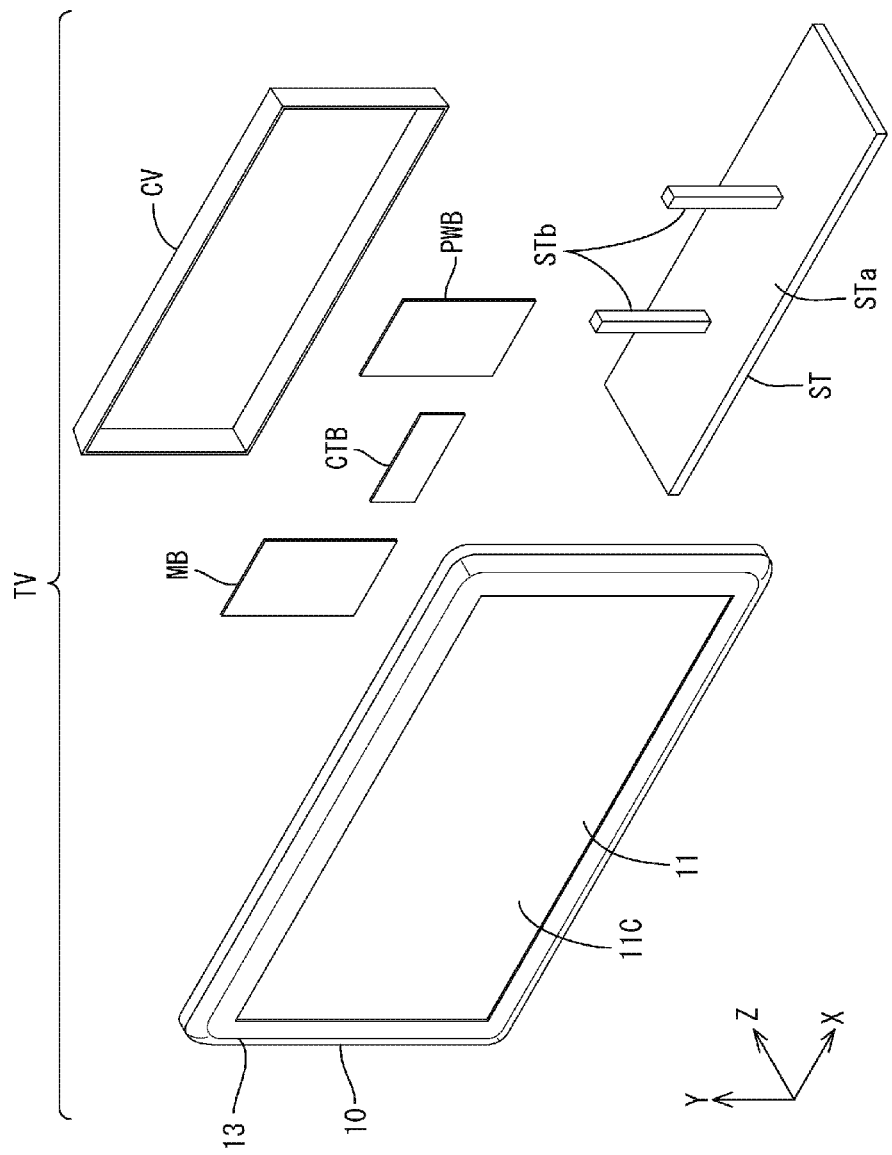
FIG. 1 is an exploded perspective view of a television receiver according to Embodiment 1.
Figure 3:
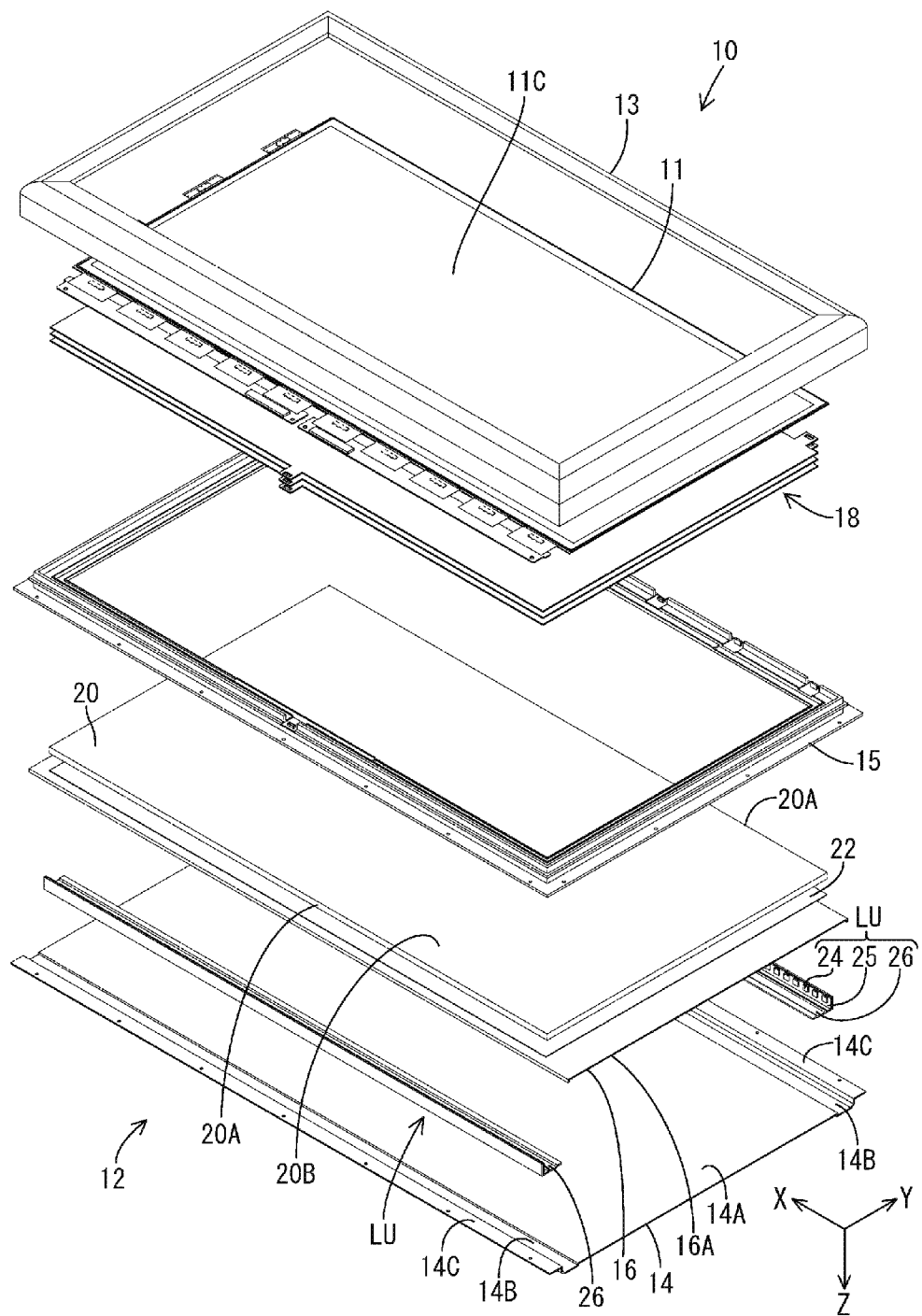
FIG. 3 is an exploded perspective view of a liquid crystal display device.

As shown in FIG. 1, a television receiver TV of the present embodiment includes a liquid crystal display device 10, various types of boards PWB, MB, CTB attached to the rear surface side of the liquid crystal display device 10, a cover member CV attached to the rear surface side of the liquid crystal display device 10 to cover the various types of boards PWB, MB, CTB, and a stand ST. The television receiver TV is supported by the stand ST such that the display surface of the liquid crystal display device 10 substantially matches the Y axis direction (vertical direction). The liquid crystal display device 10 is the above-mentioned television receiver TV but without at least the configuration for receiving television signals (the tuner member of the main board MB or the like). As shown in FIG. 3, the liquid crystal display device 10 has a horizontal quadrangular (rectangular) shape as a whole, and includes a liquid crystal panel (one example of a laminated member (optical component) and display panel) 11 having a display surface 11C where images are displayed, and a backlight device 12 as an external light source (one example of an illumination device) sandwiched between a pair of cabinets 13 and 14. Of the pair of cabinets 13 and 14, the one exposed to the front side of the liquid crystal display device 10 is the front cabinet 13, and the one exposed to the rear side of the liquid crystal display device 10 is the rear cabinet 14.

Figure 2:
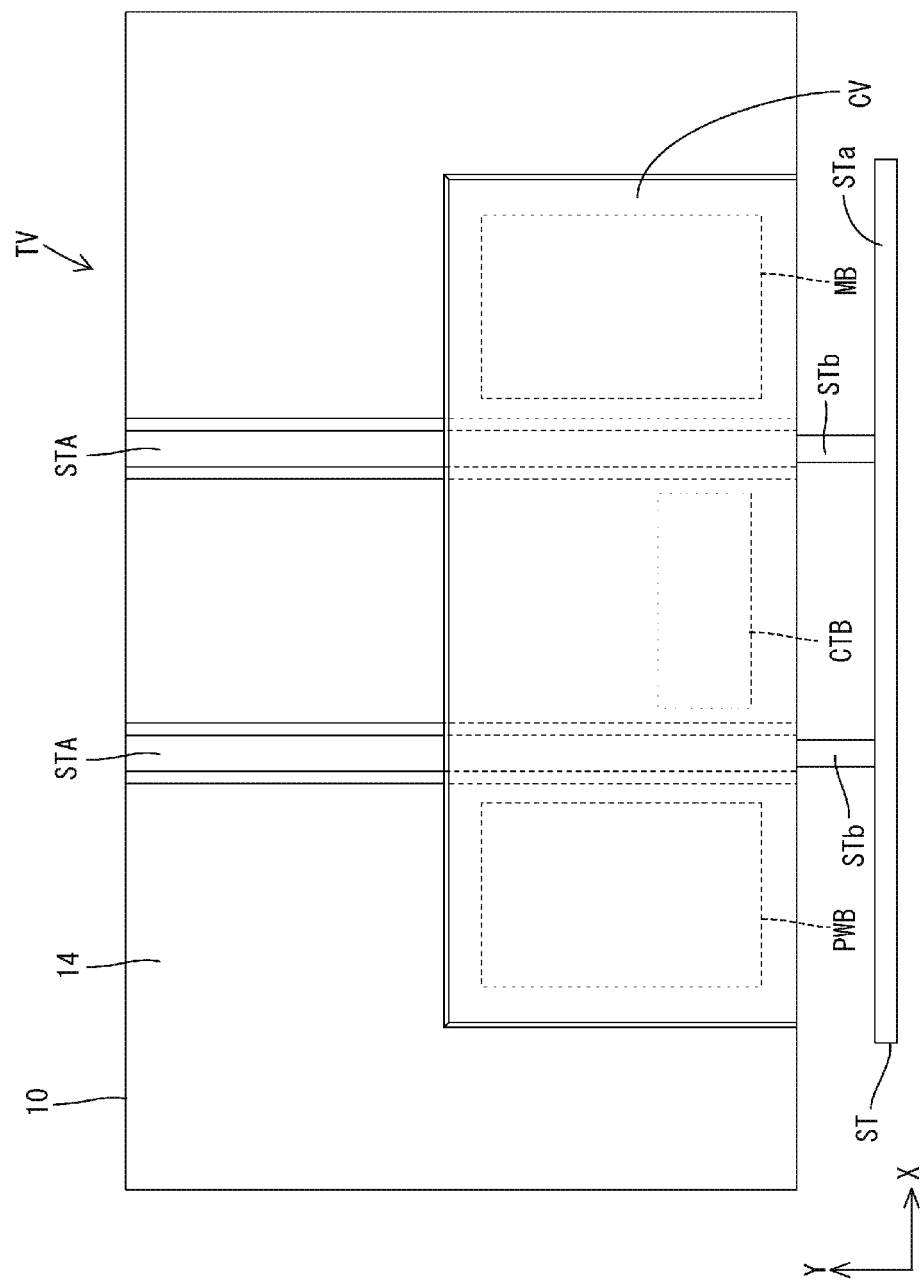
FIG. 2 is a rear view of the television receiver and a liquid crystal display device.

First, the configuration of the rear side of the liquid crystal display device 10 will be explained. As shown in FIG. 2, on the rear surface of the rear cabinet 14 that constitutes the rear exterior of the liquid crystal display device 10, a pair of stand attachment members STA extending along the Y axis direction is attached at two areas that are separated from each other along the X axis direction. The cross-sectional shape of these stand attachment members STA has a substantially channel shape that opens toward the rear cabinet 14, and a pair of support columns STb of the stand ST is inserted into respective spaces formed between the stand attachment members STA and the rear cabinet 14, respectively. The stand ST is constituted by a base STa that is disposed in parallel to the X axis direction and the Z axis direction, and the pair of support columns STb that stand on the base STa along the Y axis direction. The cover member CV is made of a synthetic resin, and is attached so as to cover about a half of the lower part of the rear surface of the rear cabinet 14 of FIG. 2, while extending across the pair of stand attachment members STA along the X axis direction. Between the cover member CV and the rear cabinet 14, a component housing space is provided to house the components mentioned below such as the various boards PWB, MB, and CTB.

As shown in FIG. 2, the various boards PWB, MB, and CTB include a power supply board PWB, the main board MB, and a control board CTB. The power supply board PWB is a power source for the liquid crystal display device 10, and can supply driving power to other boards MB and CTB, LEDs (one example of a light source) 24 of the backlight device 12, and the like. Therefore, the power supply board PWB doubles as an LED driver board that drives the LEDs 24. The main board MB has at least a tuner part that can receive television signals, and an image processing part that performs image-processing on the received television signals (neither the tuner part nor the image processing part is shown in the figure), and can output the processed image signals to the control board CTB described below. When the liquid crystal display device 10 is connected to an external video playback device (not shown), an image signal from the video playback device is inputted into the main board MB, and the main board MB can output the image signal to the control board CTB after processing the signal in the image processing section. The control board CTB has the function of converting the image signal inputted from the main board MB to a signal for driving liquid crystal, and supplying the converted signal for liquid crystal driving to the liquid crystal panel 11.

Figure 5:
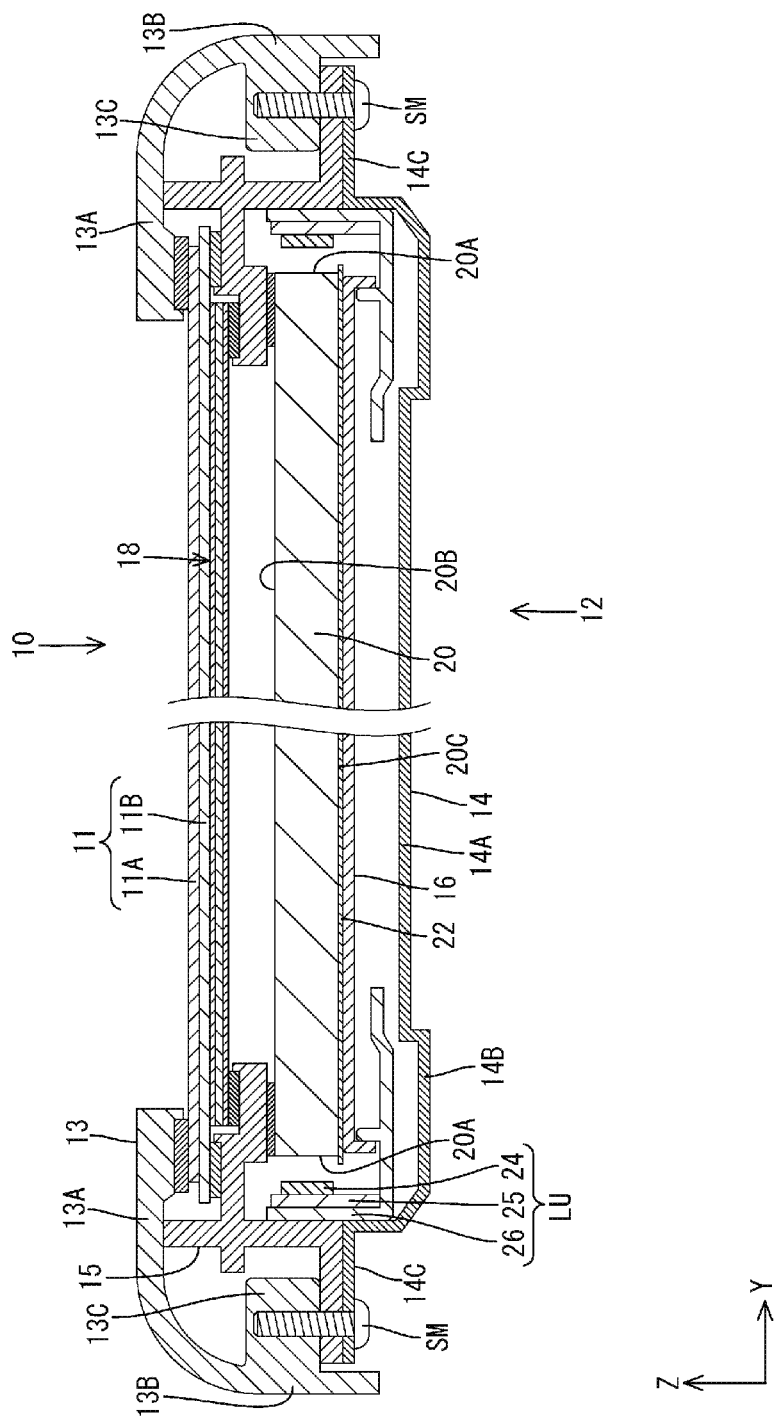
FIG. 5 is a cross-sectional view of the liquid crystal display device cut along the widthwise direction thereof in a center area where the edge of the optical sheets is arranged.

As shown in FIGS. 3 and 5, the liquid crystal panel 11 has a rectangular shape in a plan view, and is stacked on the optical sheets 18 as described later. The liquid crystal panel 11 has a configuration in which a pair of glass substrates 11A and 11B having high light transmittance are bonded to each other with a prescribed gap therebetween while having liquid crystal sealed between the two substrates 11A and 11B. Of the two substrates 11A and 11B, the one on the front side (front surface side) is a CF substrate 11A, and the other on the rear side (rear surface side) is an array substrate 11B. On the array substrate 11B, switching elements (TFTs, for example) connected to source wiring lines and gate wiring lines that intersect with each other, pixel electrodes connected to the switching elements, an alignment film, and the like are provided. On the other hand, on the CF substrate 11A, color filters having respective colored portions such as R (red), G (green), and B (blue) arranged in a prescribed pattern, an opposing electrode, an alignment film, and the like are provided. Polarizing plates (not shown) are respectively provided on outer sides of the two substrates 11A and 11B.

Figure 6:
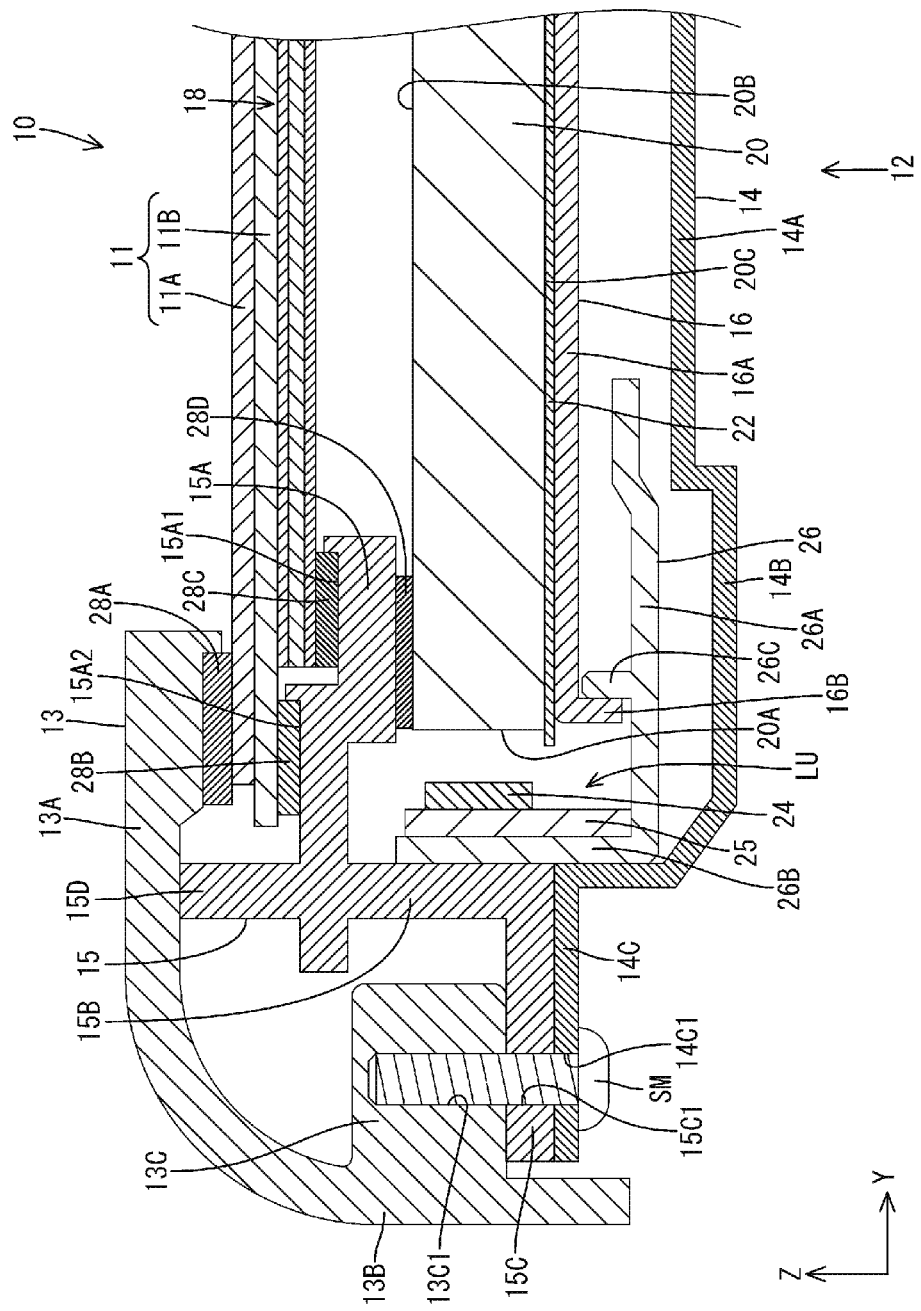
FIG. 6 is an enlarged view of main parts of FIG. 5.
Figure 7:
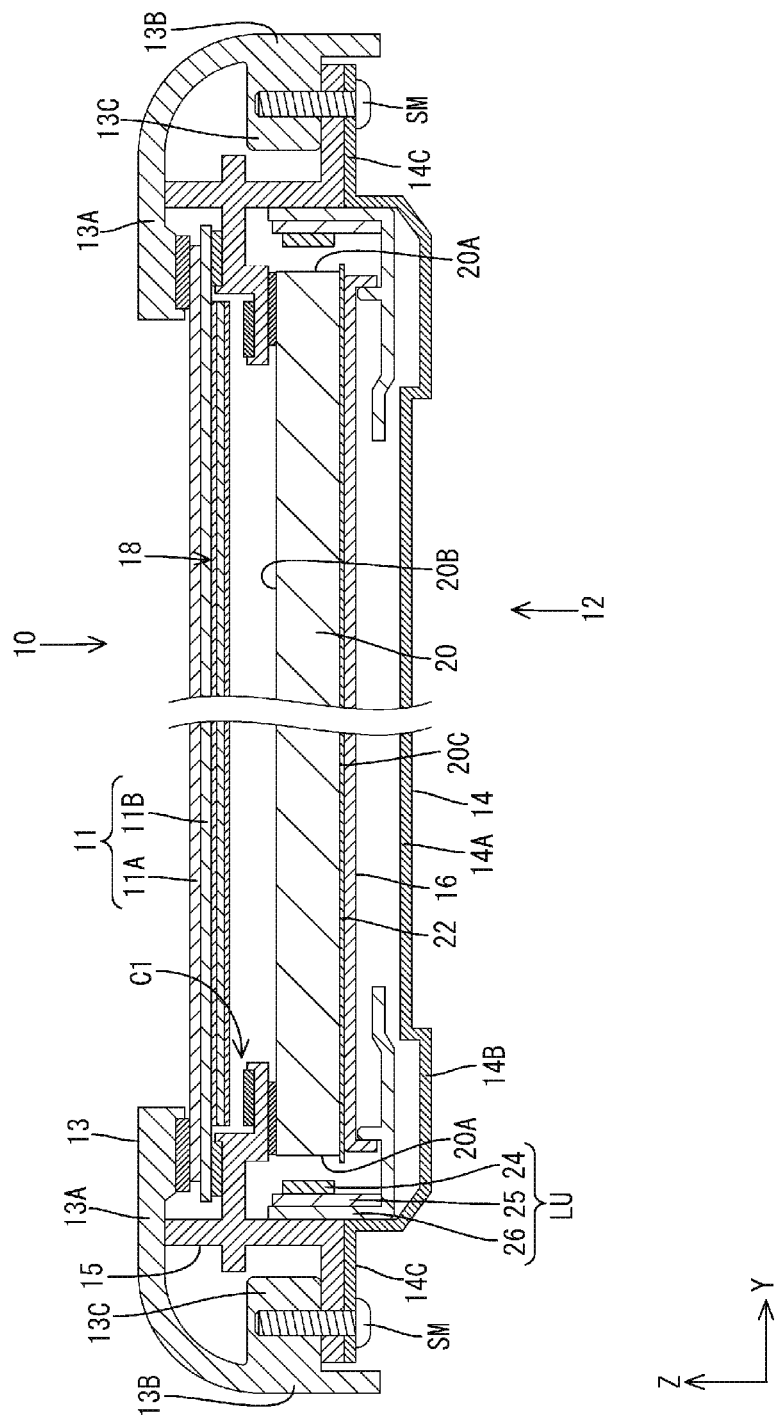
FIG. 7 is a cross-sectional view of the liquid crystal display device cut along the widthwise direction thereof on both ends where the edge of the optical sheets is arranged.

As shown in FIGS. 5 and 6, the array substrate 11B, which is one of the pair of substrates 11A and 11B forming the liquid crystal panel 11, has an edge protruding further out than the CF substrate 11A. Specifically, the array substrate 11B is formed slightly larger than the CF substrate 11A so that the entire periphery of the array substrate protrudes beyond the periphery of the CF substrate 11A. On one of the lengthwise ends of the array substrate 11B, a plurality of terminals are provided and led out from the gate wiring lines and source wiring lines described another, and these terminals are respectively connected to a flexible substrate on which a driver for driving the liquid crystal is mounted. The terminals are respectively configured to receive signals from the control board CTB described above via the flexible substrate and thereby display images on the display surface 11C of the liquid crystal panel 11.

The front cabinet 13 presses the liquid crystal panel 11 from the front side and forms the front exterior of the liquid crystal display device 10. The front cabinet 13 is made of a metal such as aluminum, for example, and has higher mechanical strength (rigidity) and heat conductivity as compared to if the front cabinet 13 were made of a synthetic resin. As shown in FIG. 3, the front cabinet 13 is formed in a horizontally-long frame shape as a whole so as to enclose the display area on the display surface 11C of the liquid crystal panel 11. The front cabinet 13 has a panel pressing portion 13A disposed in parallel to the display surface 11C of the liquid crystal panel 11 and that presses the liquid crystal panel 11 from the front side and a side wall 13B that protrudes from the periphery of the panel pressing portion 13A towards the rear side. The cross-sectional shape of the front cabinet 13 is approximately an "L" shape in which the boundary between the panel pressing portion 13A and the side wall 13B is curved.

The panel pressing portion 13A that forms a part of the front cabinet 13 has a horizontally-long frame shape along the periphery (non-display area) of the liquid crystal panel 11 and can press almost the entire periphery of the liquid crystal panel 11 from the front side. As shown in FIG. 6, a cushioning member 28A is interposed between the panel pressing portion 13A and the liquid crystal panel 11. The front outer surface of the panel pressing portion 13A (the surface opposite to the side facing the liquid crystal panel 11) is exposed to the outside on the front side of the liquid crystal display device 10 similar to the display surface 11C of the liquid crystal panel 11, and constitutes the front of the liquid crystal display device 10 together with the display surface 11C of the liquid crystal panel 11.

The side walls 13B forming a portion of the front cabinet 13 have a substantially cylindrical shape that protrudes from the periphery of the panel pressing portion 13A towards the rear side. The side walls 13B enclose the entire periphery of the backlight device 12. The outer surfaces of the side walls 13B along the circumferential direction of the liquid crystal display device 10 are exposed to the outside in the circumferential direction of the liquid crystal display device 10, and constitute the top face, the bottom surface, and the side faces of the liquid crystal display device 10. As shown in FIG. 6, the inner surfaces of the side walls 13B are integrally formed with screw attachment portions 13C to which screws SM are attached from the rear side. The screw attachment portions 13C have a substantially block shape that protrudes from the inner surface of the respective side walls 13B to inside (towards the frame 15, described later). The screw attachment portions 13C can sandwich a portion of the frame 15 together with the rear cabinet 14 provided on the rear side of the liquid crystal display device 10, and the screw attachment portions hold these portions with the screws SM to the rear cabinet 14 from the rear side. Furthermore, the screw attachment portions 13C open towards the rear side and have formed therein front cabinet screw holes 13C1 to which the screws SM can be fastened.

The rear cabinet 14 forms the rear exterior of the liquid crystal display device 10. The rear cabinet 14 is made of a metal such as aluminum, in a similar manner to the front cabinet 13, and as shown in FIG. 3, has as a whole an approximately shallow-plate shape that is horizontally long and that covers almost the entire rear side of the liquid crystal display device 10. The outer surface of the rear cabinet 14 facing the rear side is exposed to the rear exterior of the liquid crystal display device 10 and forms the rear surface of the liquid crystal display device 10. As shown in FIGS. 5 and 6, the rear cabinet 14 is made of a bottom plate 14A that has a horizontally-long plate shape, stepped portions 14B that protrude in a step shape toward the rear side from both lengthwise ends of the bottom plate 14A, and extending portions 14C that extend outward from the ends of the stepped portions 14B and rise towards the front beyond the bottom plate 14A.

The bottom plate 14A and stepped portions 14B forming the rear cabinet 14 are arranged, with prescribed gaps therebetween, between a chassis 16 and a heat-dissipating member 26, which form a portion of the rear side of the backlight device 12 as described later. The extending portions 14C forming a part of the rear cabinet 14 extend outward to a position overlapping the screw attachment portion of the front cabinet. The extending portions 14C have surfaces that make surface-to-surface contact with almost the entire outer frame section 15C of the frame 15, which is described later. The extending portions 14C have formed therein rear cabinet screw holes 13C1 in which the screws SM described above can be inserted, and the screws SM are inserted from outside.

Next, the backlight device 12 will be described. As shown in FIG. 3, the main constituting components of the backlight device 12 are housed in a space between the frame (one example of a frame member) 15 that constitutes the front exterior and the chassis 16 that constitutes the rear exterior. The main constituting components housed between the frame 15 and the chassis 16 at least include optical sheets 18, a light guide plate 20, a reflective sheet 22, and LED units LU. Of these, the liquid crystal panel 11 and the optical sheets 18 are held in a state stacked on one another by the front cabinet 13 and the frame 15. Meanwhile, the light guide plate 20 is sandwiched by the frame 15 and the chassis 16. The LED units LU of the backlight device 12 are disposed in the frame 15 and the chassis 16 so as to face each other from respective ends in the widthwise direction (Y axis direction) of the light guide plate 20. The respective constituting components will be explained below.

First, the configurations of the light guide plate 20, reflective sheet 22, chassis 16, and LED units LU will be explained. The light guide plate 20 is made of a synthetic resin (an acrylic resin such as PMMA or a polycarbonate, for example) with a sufficiently higher refractive index than air and is almost completely transparent (excellent light transmission). As shown in FIG. 3, the light guide plate 20 has a horizontally-long quadrangular shape in a plan view, in a manner similar to the liquid crystal panel 11 and the optical sheets 18 (described later). The lengthwise direction of the surface of the light guide plate 20 corresponds to the X axis direction, the short side to the Y axis direction, respectively, and the plate thickness direction intersecting with the surface corresponds to the Z axis direction. The light guide plate 20 faces the rear side of the optical sheets 18 with a prescribed gap therebetween. Each of the side faces on the long side of the light guide plate 20 is a light-entering face 20A where the light emitted from the LEDs 24 enters.

As shown in FIGS. 3 and 5, the light guide plate 20 has a pair of the light-entering faces 20A thereof facing the respective LED units LU, and the light-exiting surface 20B, which is the primary (front) surface of the light guide plate, faces the optical sheets 18, and the opposite surface 20C, which is the surface opposite to the light-exiting surface 20B, faces the reflective sheet 22. The light guide plate 20 is supported by the chassis 22 (described later) via the reflective sheet 26. The direction in which the light guide plate 20 aligns with the LED units LU corresponds to the Y axis direction, and the direction in which the light guide plate 20 aligns with the optical sheets 18 and the reflective sheet 22 corresponds to the Z axis direction. The light guide plate 20 functions to receive the light emitted along the Y axis direction from the LED units LU from the light-entering faces 20A, to cause the light to travel toward the optical sheets 18 while propagating the light internally, and to make the light exit from the light-exiting surface 20B.

The reflective sheet 22 has the shape of a rectangular sheet, is made of a synthetic resin, and the surface thereof is white with excellent light-reflecting characteristics. The lengthwise direction of the reflective sheet 22 corresponds to the X axis direction, the short side direction to the Y axis direction, and the reflective sheet is sandwiched between the opposite surface 20C of the light guide plate 20 and spacers 16 described later (see FIGS. 3 and 5). The front side of the reflective sheet 22 has a reflective surface, and this reflective surface touches the opposite surface 20C of the light guide plate 20. The reflective sheet 22 can reflect light that has leaked from the respective LED units LU or the light guide plate 20 back toward the reflective surface of the reflective sheet. Also, the reflective sheet 22 is slightly bigger than the opposite surface 20C of the light guide plate 20. As shown in FIG. 6, the edges of the reflective sheet stick out slightly beyond the edges of the light guide plate 20.

As shown in FIG. 3, the LED units LU are respectively arranged along the lengthwise direction of the light guide plate 20, and the lengthwise direction dimensions of the LED units LU are approximately the same as the lengthwise dimensions of the light guide plate 20. Each of the LED units LU is constituted by an LED 24, an LED substrate 25, and the heat-dissipating member 26. Each of the LEDs 24 that constitutes a portion of the respective LED units LU is made by sealing an LED chip (not shown) by a resin on a substrate section that is fixed to the LED substrate 25. The LED chip mounted on the substrate portion has one primary wavelength, specifically emitting only blue light. On the other hand, a phosphor that emits a prescribed color when excited by blue light emitted from the LED chip is dispersed in the resin package that seals the LED chip, and the LED chip as a whole emits light that is largely white. For the phosphor, a yellow phosphor that emits yellow light, a green phosphor that emits green light, and a red phosphor that emits red light can be combined appropriately for use, or only one of the phosphors can be used, for example. The LEDs 28 are the so-called top-emitting type, for which the primary light-emitting face is the surface opposite to the mounting surface of the LED substrate 25 (the surface facing the light-entering face 20A of the light guide plate 20).

As shown in FIG. 3, the LED substrates 25 of the respective LED units LU are each formed in a narrow plate shape that extends along the lengthwise direction (X axis direction) of the light guide plate 20 such that each surface thereof is parallel to the X axis direction and the Z axis direction, or in other words, in parallel with the light-entering faces 20A of the light guide plate 20. The lengthwise direction (X axis direction) dimensions of the LED substrates 25 is approximately the same as the lengthwise direction (X axis direction) dimensions of the light guide plate 20. On the inner surface of the LED substrates 25, or in other words on the surface facing the light guide plate 20 (the surface opposing the light guide plate 20), the LEDs 24 having the configuration described above are mounted. This surface is considered to be a mounting surface. A plurality of the LEDs 24 are disposed on the mounting surface of the respective LED substrates 25 along the length direction (the X axis direction) thereof in a row (in a straight line) with prescribed gaps therebetween. That is, the plurality of the LEDs 24 are disposed intermittently on each of the edges of the longer sides of the backlight device 12 along the lengthwise direction. The gaps between the adjacent LEDs 24 along the X axis direction, or in other words the array pitch of the LEDs 24, are approximately the same. The alignment direction of the LEDs 24 coincides with the lengthwise direction (X axis direction) of the LED substrates 25. A wiring pattern (not shown) made of metal film (copper foil, for example) is formed on the mounting surface of the LED substrates 25. The wiring pattern extends along the X axis direction and goes across the group of LEDs 24 connecting the adjacent LEDs 24 in series. By connecting to a power supply board (not shown) via a wiring member such as a connector or a cable, terminals formed at both ends of the wiring pattern supply driving power to each of the LEDs 24. The LED substrate 25 is attached to the heat-dissipating member 32 described next.

The heat-dissipating members 26 that constitutes the respective LED unit LUs are made of a metal such as aluminum that has excellent heat conductivity, for example. As shown in FIG. 6, the heat-dissipating member 26 includes a heat-dissipating portion 26A, a rising portion 26B that rises from one end of the heat-dissipating portion, and a protrusion 26C that protrudes from approximately the middle of the heat-dissipating portion 26A. These portions are substantially "L" shaped in a cross-sectional view. This heat-dissipating member 26 is arranged opposite to the frame 15 across the LED 24. The lengthwise dimension of the heat-dissipating member 26 is approximately the same as that of the LED substrate 25. The heat-dissipating portion 26A forming a part of the heat-dissipating member 26 has a plate shape that runs parallel to the plate-shaped portion 16A of the chassis 16, and the lengthwise direction of the heat-dissipating portion coincides with the Y axis direction, the widthwise direction coincides with the X axis direction, and the thickness direction coincides with the Z axis direction. The heat-dissipating portion 26A extends so as to protrude inside in the Y axis direction from the rear end of the rising portion 26B, or namely, so as to protrude toward the center of the light guide plate 20, and the tip thereof is slightly stepped towards the light guide plate 20. The entire heat-dissipating portion 26A faces the rear cabinet 14 with a prescribed gap therebetween. Thus, the heat transmitted from the LEDs 24 to the heat-dissipating member 26 is effectively dissipated from the heat-dissipating portion 26A to the rear cabinet 14.

As shown in FIG. 6, the rising portion 26B that forms a part of the heat-dissipating member 26 rises from the outer edge of the heat-dissipating portion 26A (the side opposite to the light guide plate 20) perpendicularly to the heat-dissipating portion 26A. The rising portion 26B has a plate-like shape that runs parallel to the surface of the LED substrate 25 and the light-entering face 20A of the light guide plate 20, and the lengthwise direction thereof corresponds to the X axis direction, the widthwise direction to the Z axis direction, and the thickness direction to the Y axis direction, respectively. The LED substrate 25 is attached to the inner surface of the rising portion 26B, or in other words the surface facing the light guide plate 20, by a screw or the like (not shown). The outer surface of the rising portion 26B is fastened to a connecting portion 15B of the frame 15 (described later) and the extending portion 14C of the rear cabinet 14, and this holds the heat-dissipating member 26 in place. The protrusion 26C that forms a portion of the heat-dissipating member 26 slightly protrudes from approximately the center in the extending direction (Y axis direction) of the heat-dissipating portion 26A towards the light guide plate 20, and abuts a bent portion 16B of the chassis 16 (described later). The direction in which the protrusion 26C protrudes coincides with the Z axis direction.

The chassis 16 is made of a metal such as aluminum, for example. The chassis 16 is constituted by the plate-shaped portion 16A that is horizontally-long as a whole, and the bent portion 16B that bends and extends from both ends of the lengthwise sides of the plate-shaped portion 16A towards the rear, and these portions cover almost the entire light guide plate 20 and reflective sheet 22 from the rear side. The plate-shaped portion 16A that forms a part of the chassis 16 makes surface-to-surface contact with almost the entire reflective sheet 22 and holds the light guide plate 20 and the reflective sheet 22 to the inner frame portion 15A of the frame 15 (described later). The direction in which the bent portion 16B extends coincides with the Z axis direction. The inner surface of the bent portion 16B abuts the protrusion 26C of the heat-dissipating member 26 and is fixed to the protrusion 26C by a screw or the like (not shown). In this manner, the light guide plate 20 and the chassis 16 are supported by the heat-dissipating member 26.

Next, the configuration of the frame 15 and the optical sheets 18 will be described in detail. As shown in FIG. 3, the frame 15 has a horizontally-long frame shape as a whole, similar to the rear cabinet 13, and is made of a synthetic resin, and by having the surface thereof colored black, for example, the frame 15 has light-shielding properties. The frame 15 is constituted by: the inner frame portion 15A interposed between the liquid crystal panel 11 & optical sheets 18, which are stacked on one another, and the light guide plate 16; an outer frame portion 15C interposed between the front cabinet 13 and the rear cabinet 14; the connecting portion 15B, which connects the inner frame portion 15A to the outer frame portion 15C; and the cabinet support portion 15D, which supports the front cabinet 13 from the rear side.

The inner frame portion 15A that forms a part of the frame 15 presses almost the entire periphery of the light guide plate 20 from the front side and receives almost the entire periphery of the liquid crystal panel 11 and the optical member 18 from the rear side. As shown in FIGS. 3 and 6, the inner frame portion 15A has an inner part that forms the inner section thereof, and an outer part that protrudes in a step-like fashion to the front with respect to the inner part. The inner part of the inner frame portion 15A receives, on the surface thereof, the periphery of the optical sheets 18 (hereinafter, this surface of the inner part is referred to as the "sheet receiving portion 15A1"). Meanwhile, the outer part of the inner frame portion 15A receives, on the surface thereof, the periphery of the liquid crystal panel 11 (hereinafter, this surface of the outer part is referred to as the "panel receiving portion 15A2"). Cushioning members 28C and 28B are respectively interposed between the sheet receiving portion 15A1 of the inside part of the inner frame portion 15A and the periphery of the optical sheets 18, and between the panel receiving portion 15A2 of the outer part of the inner frame portion 15A and the periphery of the liquid crystal panel 11.

The outer frame portion 15C that forms a part of the frame 15 is disposed in an area tucked more into the rear side than the inner frame portion 15A and has approximately the same height (in the Z axis direction) as opposite surface of the light guide plate. The outer frame portion 15C has a frame screw hole 15C1 formed therein, in which the screw SM can be inserted. Inserting the screw SM into the frame screw hole 15C1 while the outer frame portion 15C is sandwiched between the screw attachment portion 13C of the front cabinet 13 and the extending portion 14C of the rear cabinet 14 fastens and secures the outer frame portion 15C to the front cabinet 13 and the rear cabinet 14. The connecting portion 15B forming a portion of the frame 15 connects the inner edge of the outer frame portion 15C to the outer edge of the inner frame portion 15A and rises along the Z axis direction. The cabinet support portion 15D protrudes from the outer edge of the inner frame portion 15A towards the front and abuts the rear surface of the front cabinet 13, thereby allowing the front cabinet 13 to be mechanically supported and reinforced.

Figure 4:
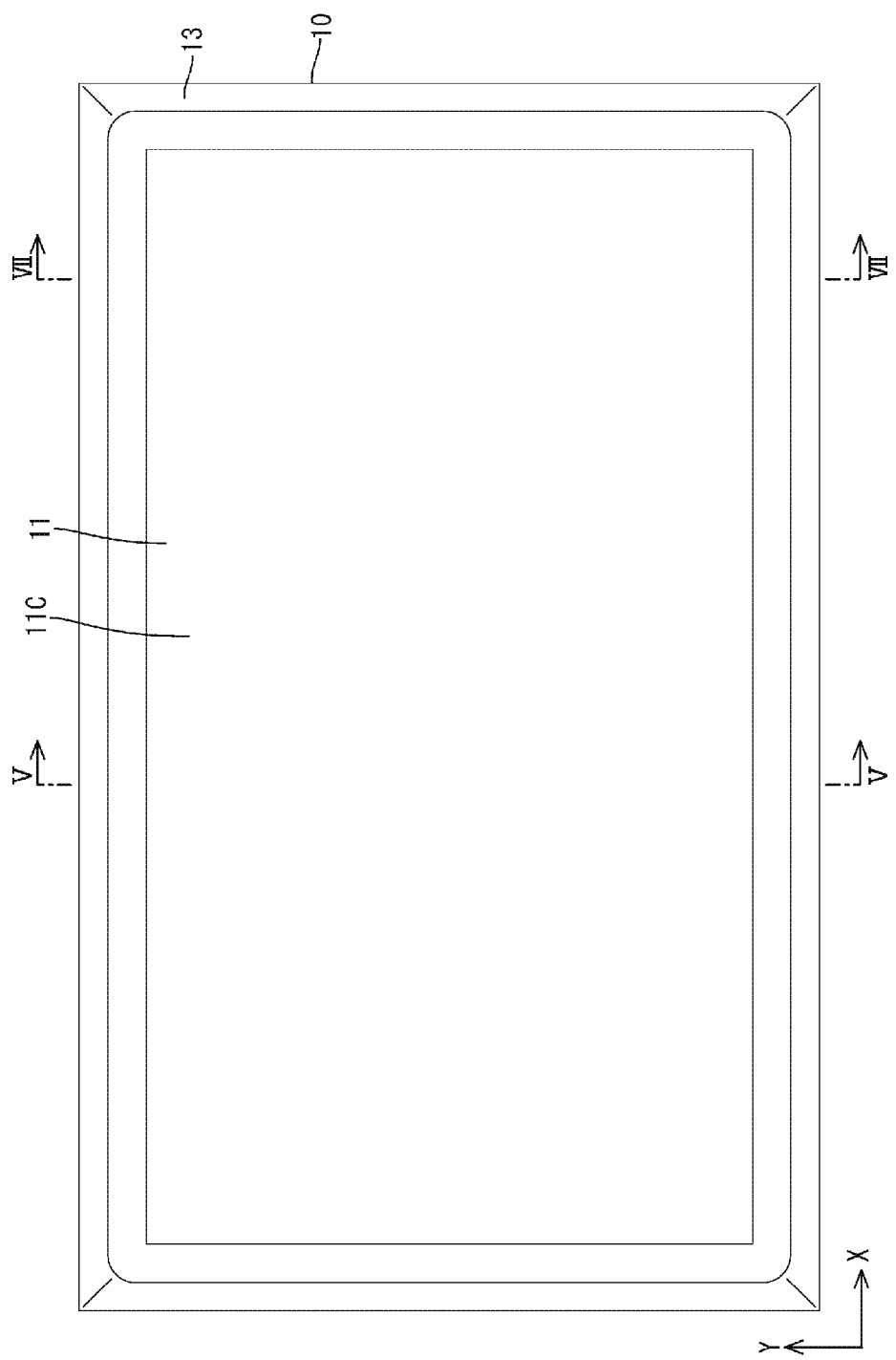
FIG. 4 is a plan view of a liquid crystal display device.

The optical sheets 18 have a horizontally-long quadrilateral shape in a plan view in a manner similar to the liquid crystal panel 11, and the size thereof (short side dimension and long side dimension) is slightly smaller than the liquid crystal panel 11. The optical sheets 18 are stacked on the rear side of the liquid crystal panel 11 and are separated from the light-exiting surface 20B of the light guide plate 20. The optical sheets 18 are constituted by stacking three sheet members on one another. Specific examples of the sheets that can be used as the optical sheets 18 include diffusion sheets, lens sheets, reflective polarizing sheets, and the like, for example. It is possible to appropriately select and use any of the above-mentioned sheets as the optical sheets. The optical sheets 18 are interposed between the liquid crystal panel 11 and the light guide plate 16, thereby transmitting the light emitted from the light guide plate 20, imparting prescribed optical effects on this transmitted light, and emitting this light towards the liquid crystal panel 11. As shown in FIG. 4, the periphery of the optical sheets 18 overlaps the sheet receiving portion 15A1 of the inner frame portion 15A of the frame 15, and is thus supported by the sheet receiving portion 15A1 via the cushioning member 28D. Thus, the edge of the optical sheets 18 is selectively sandwiched between the frame 15 and the liquid crystal panel 11.

Figure 10:
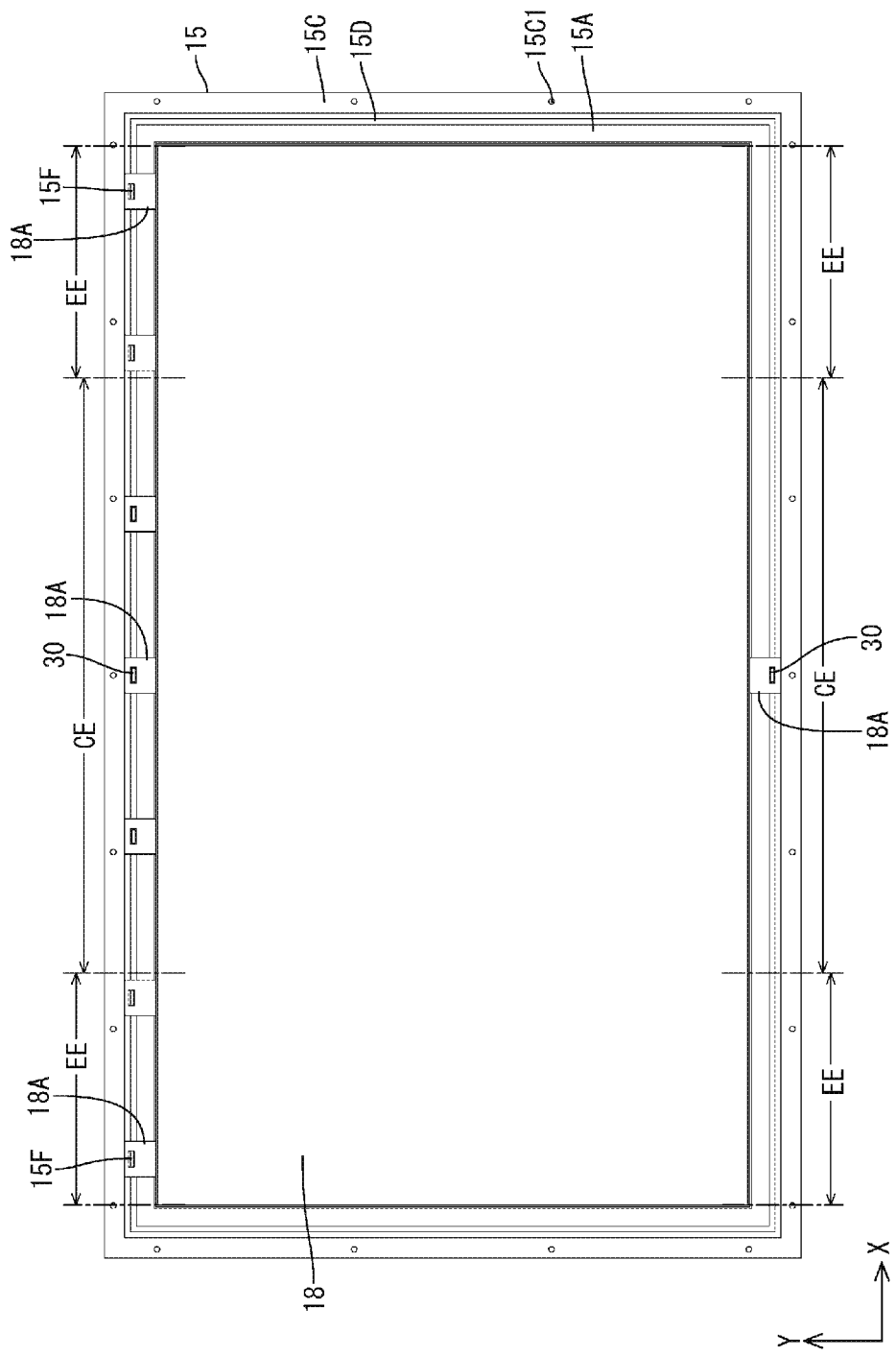
FIG. 10 is a plan view seen from the front of the frame on which the edge of the optical sheets is arranged.
Figure 13:
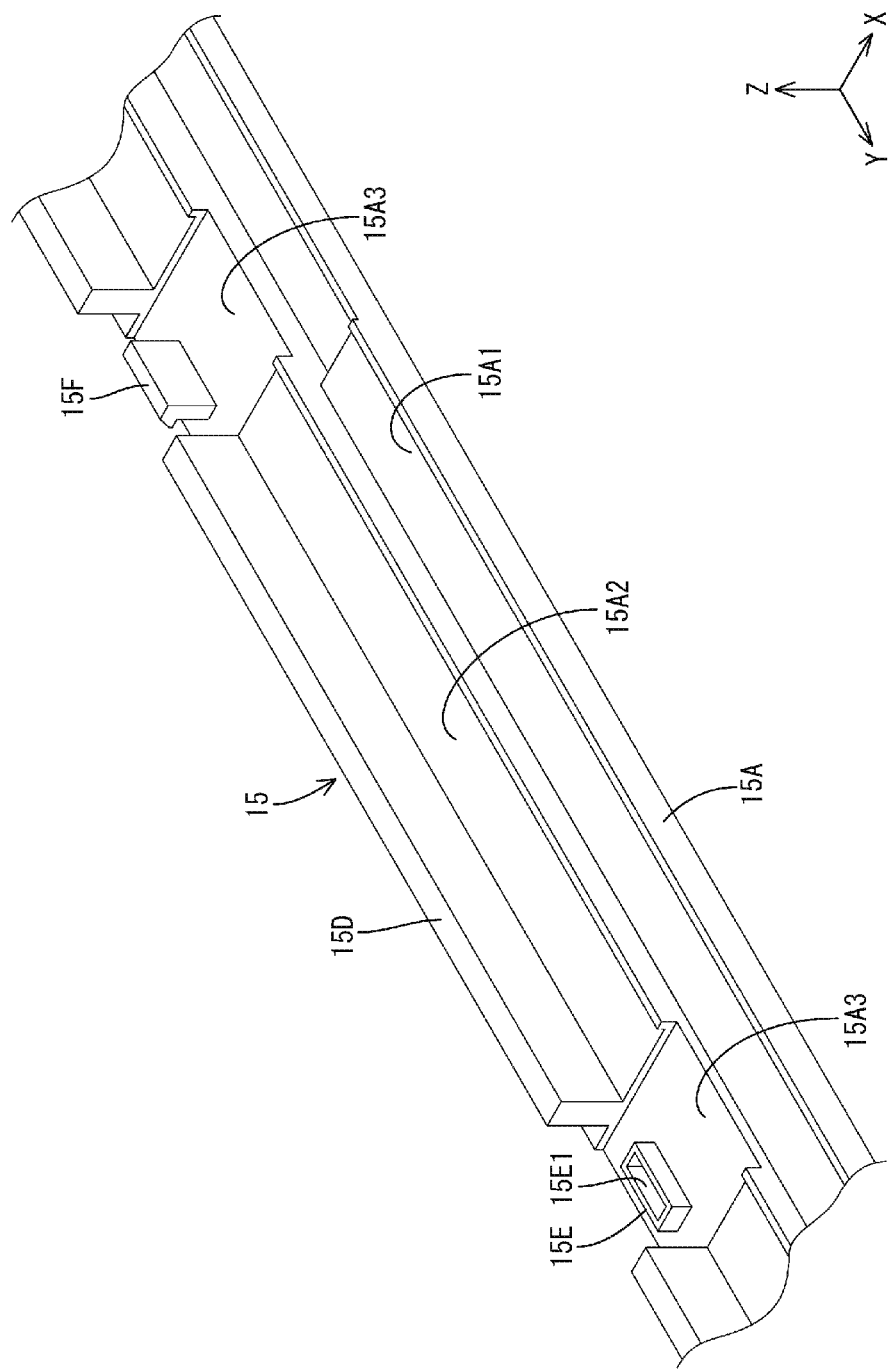
FIG. 13 is a perspective view of the frame near a boundary between the center area and both ends where the edge of the optical sheets is arranged.

As shown in FIG. 10, a plurality of tabs (one example of sheet extending portions) 18A that extend outward from a portion of the optical sheets are provided in the edge of the optical sheets 18. These tabs 18A are provided in both lengthwise ends of the optical sheets 18A. Specifically, seven of the tabs 18A are provided in one lengthwise end of the optical sheets 18 with approximately equal gaps therebetween, and one tab 18A is provided on the other lengthwise end. The respective tabs 18A protrude outside the optical sheets 18 and have the same arrangement, shape, and size on all of the respective three sheets constituting the optical sheets 18. Meanwhile, the areas on the outer part of the inner frame portion 15A of the frame 15 overlapping the respective tabs 18A on the optical sheets 18 respectively have tab receiving portions 15A3 (see FIG. 13) that can receive the tabs 18A of the optical sheets 18. The areas of the outer part of the inner frame portion 15A other than the tab receiving portions 15A3 are panel receiving portions 15A2, as described above. As shown in FIG. 13, the cabinet support portion 15D that forms a part of the frame 15 only protrudes from the section of the outer part of the inner frame portion 15A having the panel receiving portion 15A2.

Figure 11:
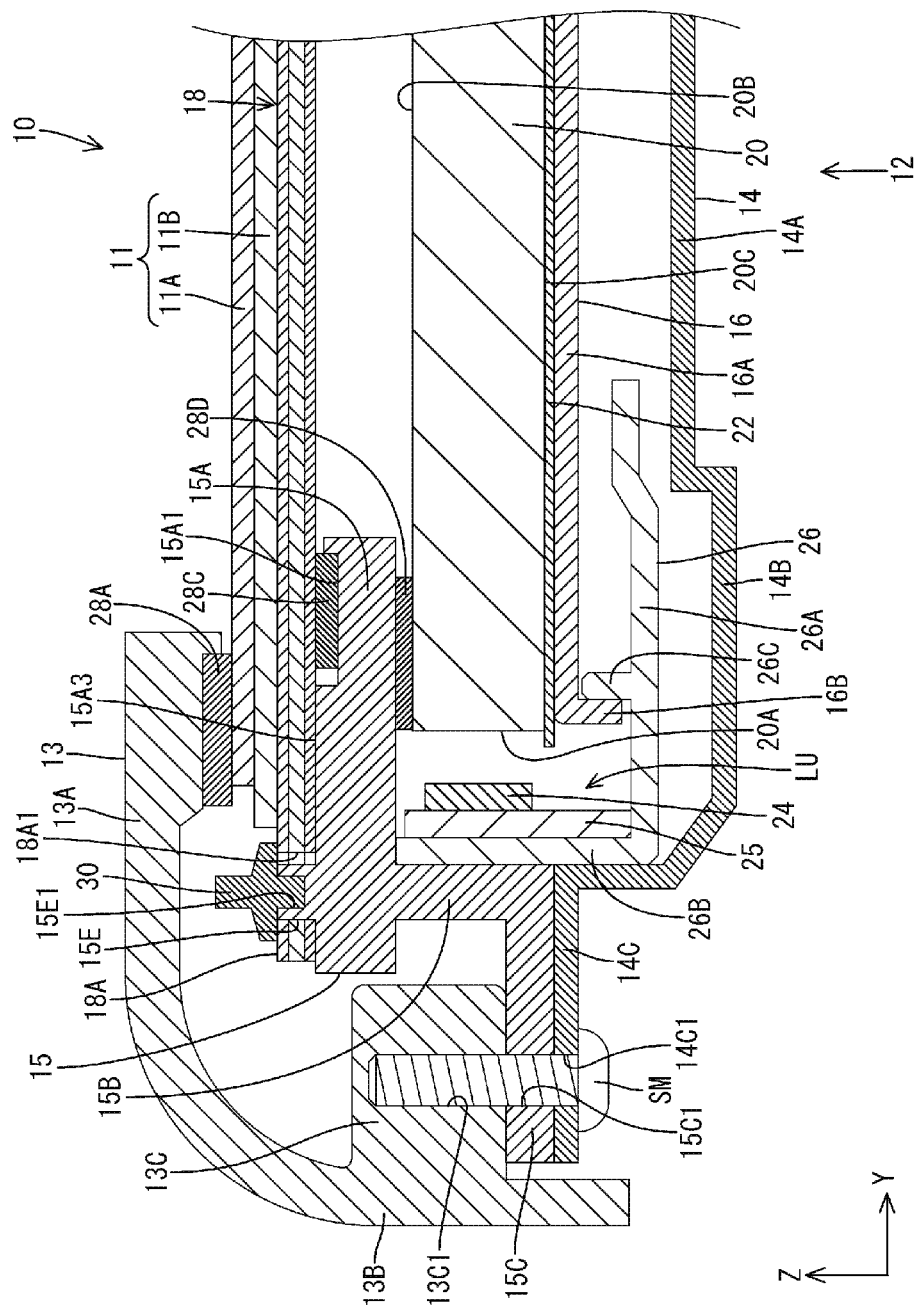
FIG. 11 is a cross-sectional view of the liquid crystal display device cut along a widthwise direction thereof and passing through an engaging pin in the center area where the edge of the optical sheets is arranged.

The respective tabs 18A in the optical sheets 18 penetrate the tabs 18A in the thickness direction (Z axis direction) and have rectangular openings 18A1 (see FIG. 11). The openings 18A1 have the same arrangement, shape, and size for the respective three sheets that constitute the optical sheets 18. Meanwhile, the tab receiving portion 15A3 of the frame 15 has an engaging section 15E and a claw-shaped part 15F, and these are inserted into the holes 18A1 in the respective tabs 18A to attach the respective tabs 18A to the tab receiving portion 18A, thereby supporting the optical sheets 18 on the frame 15. As shown in FIG. 10, the sections on both ends of the optical sheets 18 where the tabs 18A are provided are referred to as the end areas EE, and the section where the tabs are provided more towards the center than the end areas EE is referred to as the center area CE. The optical sheets 18 of the present embodiment differ in the sandwiching aspect by the frame 15 and the liquid crystal panel 11 and the attachment aspect of the frame 15 to the tab receiving section 15A3 at the edge where the tabs 18A are provided, depending on whether the area is the center area CE or end area EE.

First, the sandwiching aspect by the frame 15 and the liquid crystal panel 11 at the center area CE and the end areas EE will be described with respect to the ends of the optical sheets 18 where the tabs 18A are provided. Among the edges of the optical sheets 18 where the tabs 18A are provided, the sheet receiving portion 15A1 of the inner frame portion 15A of the frame 15 differs in height (in the Z axis direction) between the sections thereof that overlap parts of the center area CE and the sections thereof that overlap parts of the end areas EE (hereinafter, these sections will be respectively referred to as the center area overlapping sections and the end area overlapping sections). Specifically, the center area overlapping sections of the sheet receiving portion 15A1 protrude toward the front side in a step-wise fashion than the end area overlapping sections (see FIGS. 6, 8, and 13). Furthermore, as shown in FIG. 6, in the center area overlapping sections of the sheet receiving portion 15A1 of the frame 15, the sheet receiving portion 15A1 presses the edge of the optical sheets 18 via the cushioning member 28C while sandwiching this edge between the sheet receiving portion 15A1 itself and the edge of the liquid crystal panel 11. Accordingly, of the edge where the tabs 18A in the optical sheets 18 are provided, the portions located in the center area CE are sandwiched and held by the frame 15 and the liquid crystal panel 11.

Figure 8:
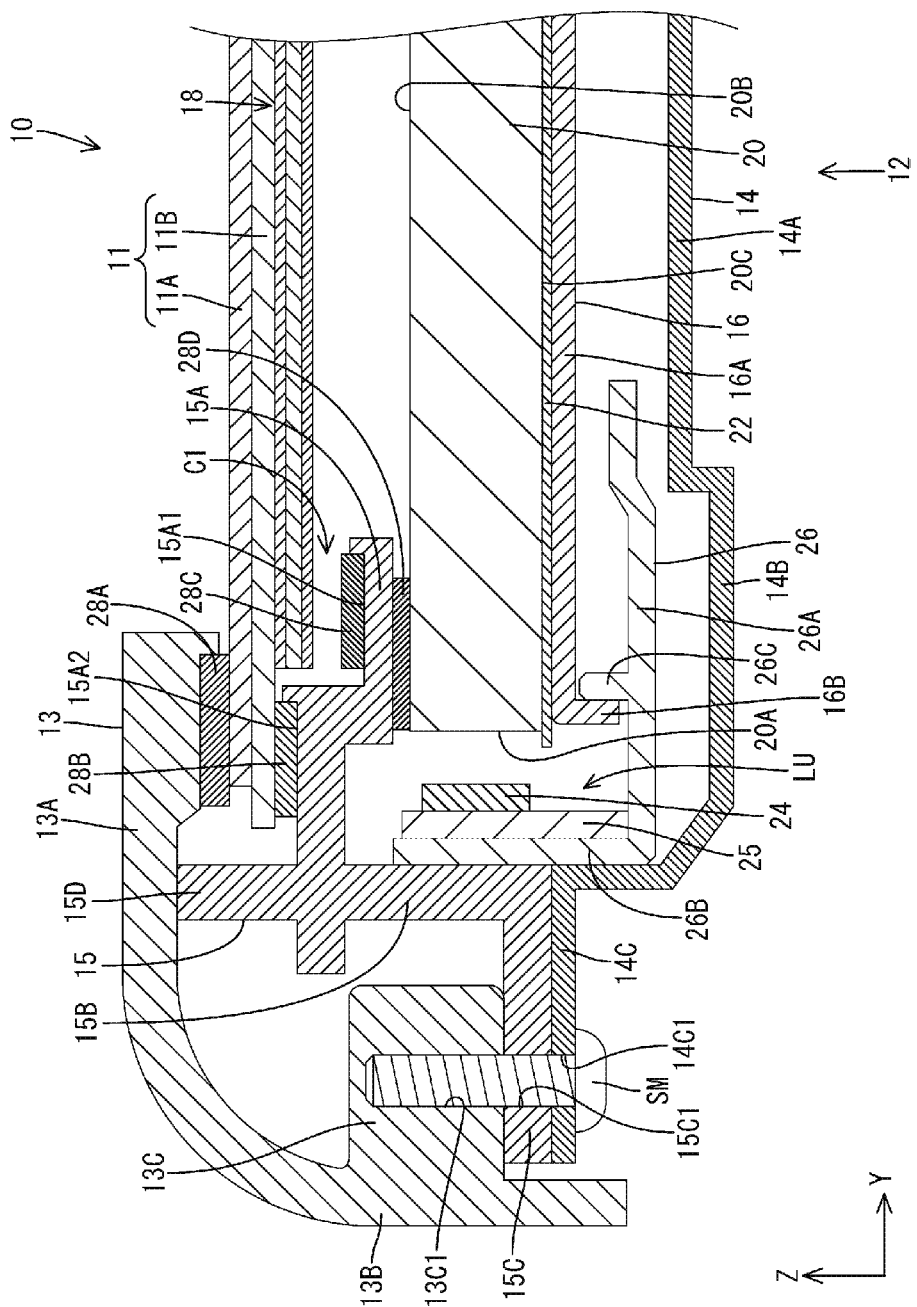
FIG. 8 is an enlarged view of main parts of FIG. 7.
Figure 9:
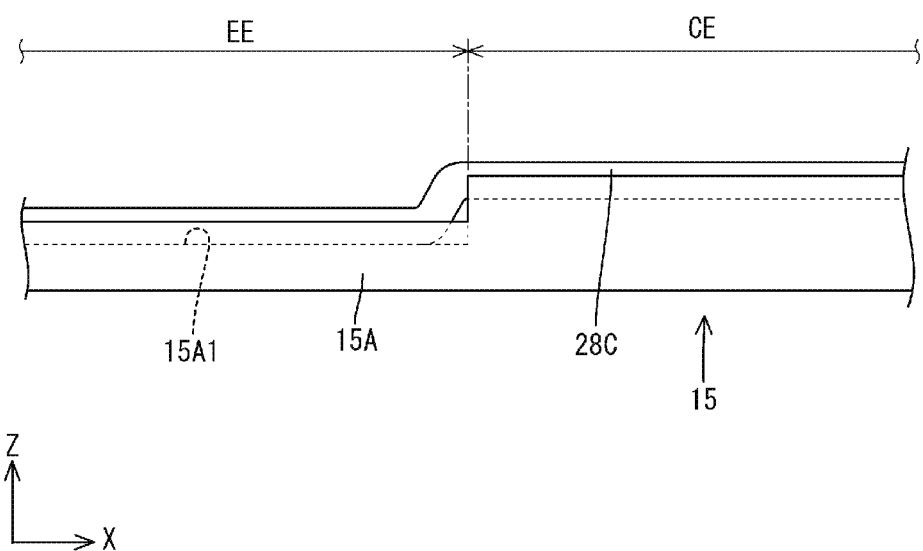
FIG. 9 is front view of a part of frame where a cushioning member has been provided near a boundary between the center area and both ends where the edge of the optical sheets is arranged.

Meanwhile, as shown in FIG. 8, in the end area overlapping sections of the sheet receiving portions 15A1 of the frame 15, the cushioning member 28C provided on the sheet receiving portion 15A1 and the edge of the optical sheets 18 are separated from each other, and a prescribed clearance C1 is present therebetween. Thus, of the edge of the optical sheets 18 where the tabs 18A are provided, the sections that are positioned in the end areas EE are not held by other members. As shown in FIG. 9, the cushioning member 28C on the sheet receiving portion 15A1 is spread across both the center area overlapping sections and the end area overlapping sections of the sheet receiving portion 15A1. Thus, the edges of the optical sheets 18 where the tabs 18A are not provided are not held by other members, in a similar manner to the sections that are positioned in the end areas EE of the edges where the tabs 18A are provided. In this manner, on the edge of the optical sheets 18, only the sections that are positioned in the center area CE of the edges provided with the tabs 18A are selectively sandwiched between the frame 15 and the liquid crystal panel 11, and the other sections are not held by the other members, but allowed to deflect in the thickness direction thereof (the Z axis direction).

Figure 14:
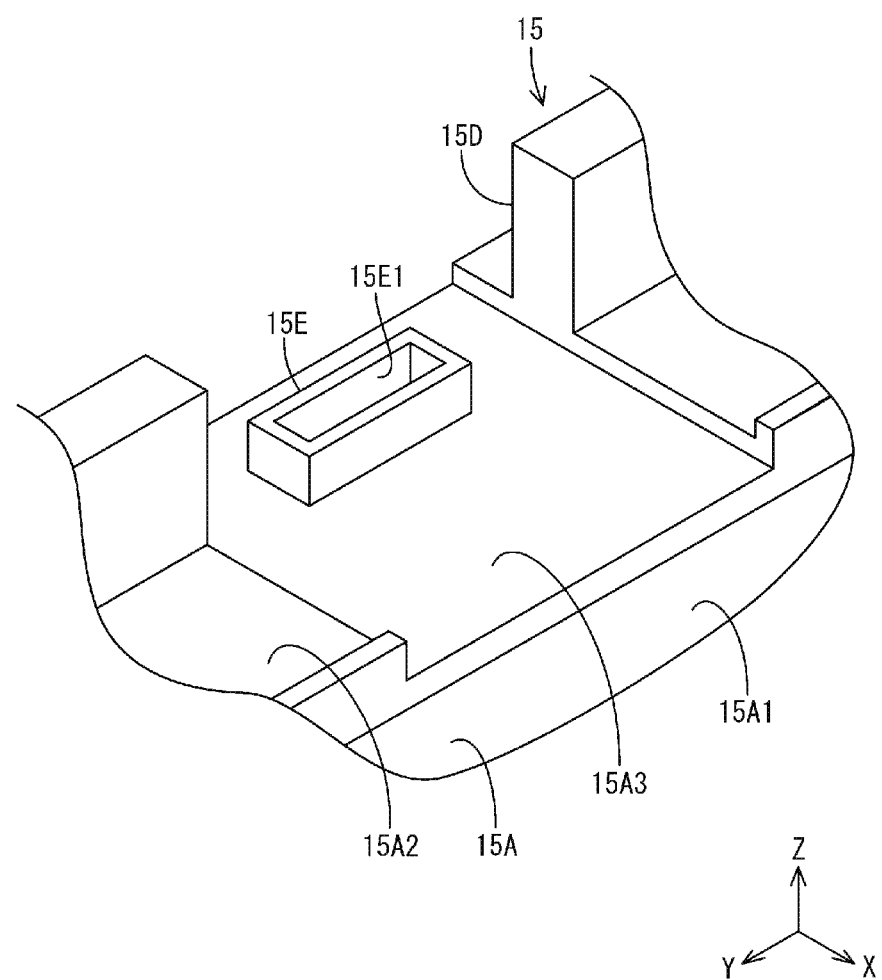
FIG. 14 is a perspective view of an attachment aspect of an engaging member and the optical sheets with respect to the engaging section.

Next, the attachment aspect of the tab receiving portions 15A3 of the frame 15 in the center area CE and the end areas EE of the edges where the tabs 18A of the optical sheets 18 are provided will be explained. The respective tabs 18A of the optical sheets 18 differ in the attachment aspect thereof to the tab receiving portions 15A3 of the frame 15, depending on whether the tab is positioned in the center area CE or positioned in the end area EE. First, the tabs 18A positioned in the center area CE will be explained. As shown in FIGS. 11 and 14, the tab receiving portion 15A3 positioned in the center area overlapping section of the sheet receiving portion 15A1 of the frame 15 has engaging sections 15E that protrude in a block shape towards the front side (the optical sheet 18 side) from the tab receiving portion 15A3. The size of the peripheral surface of the engaging section 15E is slightly smaller than the opening 18A1 provided in the tabs 18A of the optical sheets 18, which makes it possible for the engaging sections 15E to be inserted in the openings 18A1. Furthermore, the height of protrusion of the engaging section 15E is approximately equal to the thickness of the optical sheets 18.

An engaging recess 15E1 is provided inside the engaging section 15E. An engaging member 30 such as that shown in FIGS. 11 and 16 engages this engaging recess 15E1. This engaging member 30 is constituted by a front protrusion 30A that protrudes towards the front, a rear protrusion 30C that protrudes towards the rear, and a projection 30B that projects from the boundary of the front protrusion 30A and the rear protrusion 30C laterally across the entire peripheries thereof. Of the engaging member 30, the projection 30B is slightly larger than the opening 18A1 in the tab 18A of the optical sheets 18. Furthermore, the rear protrusion 30C can engage the engaging recess 15E1 of the engaging section 15E because the engaging member 30 has a protrusion and the engaging section 15E has a recess to receive this protrusion.

Figure 15:
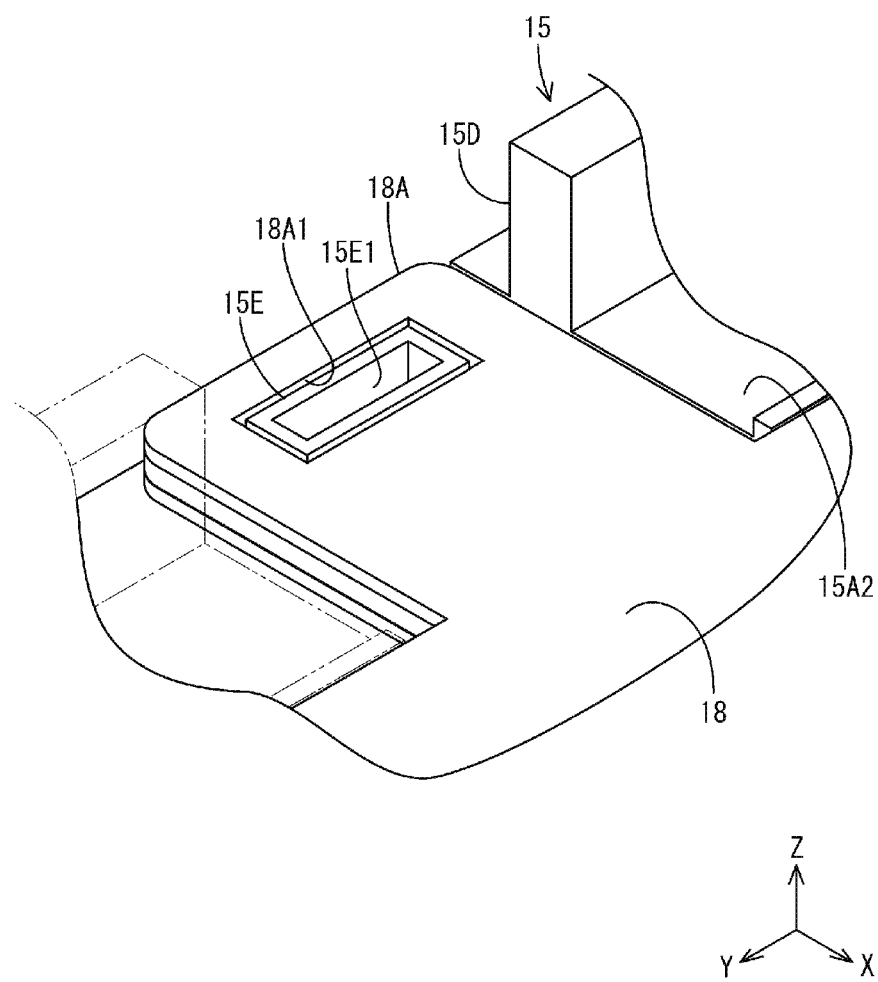
FIG. 15 is a perspective view of an attachment aspect of an engaging member and the optical sheets with respect to the engaging section.
Figure 16:
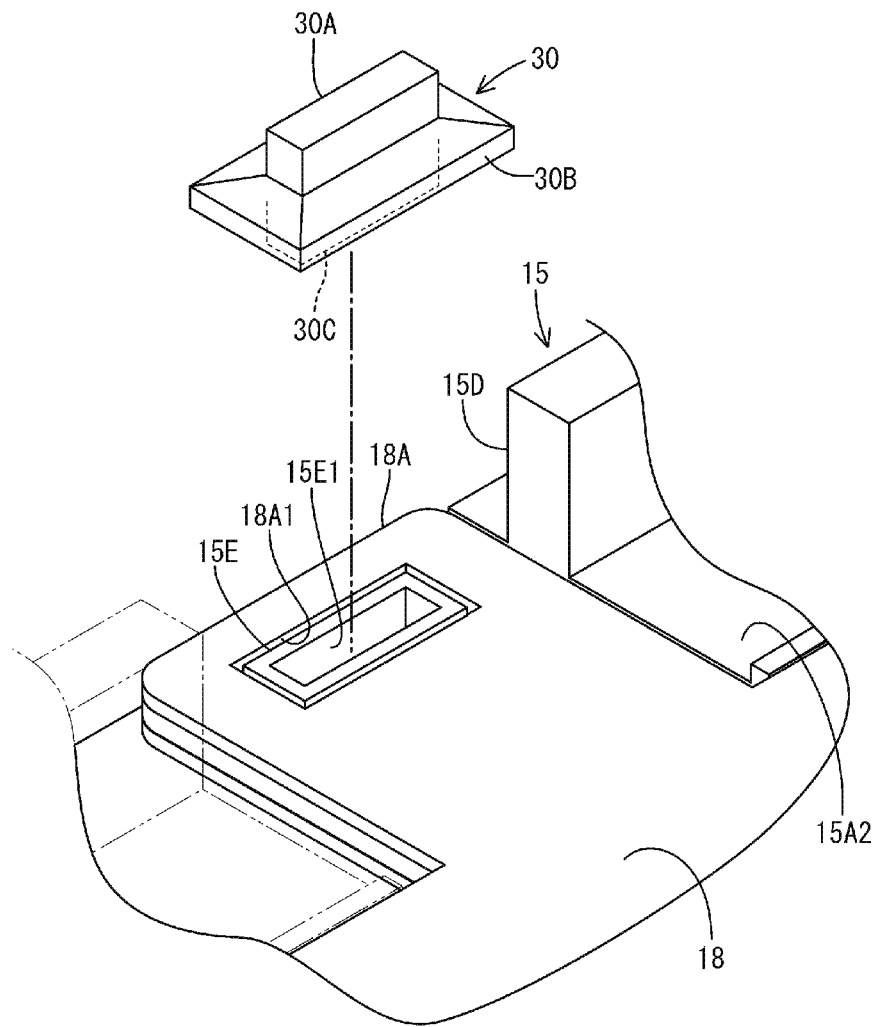
FIG. 16 is a perspective view of an attachment aspect of an engaging member and the optical sheets with respect to the engaging section.
Figure 17:
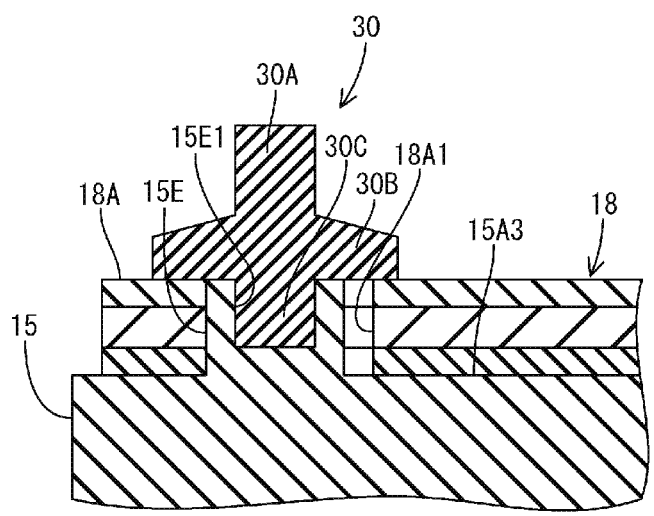
FIG. 17 is a cross-sectional view of an engaging section to which the optical sheets and the engaging member are attached.

When the tabs 18A positioned in the center area CE of the optical sheets 18 are attached to the tab receiving portions 15A3 where the engaging sections 15E are provided, as shown in FIGS. 14 and 15, first the engaging section 15E is inserted into the opening 18A1 in the tab 18A. At such time, the position of the optical sheets 18 in the sheet surface direction (X-Y planar direction) is determined by the peripheral surface of the engaging section 15E abutting the edges of the opening 18A1. Furthermore, while the engaging section 15E is inserted into the opening 18A1 in the tab 18A, the height of the tip of the engaging section 15E is approximately equal to the height of the surface of the optical sheets 18 (see FIG. 15). Next, as shown in FIG. 16, the rear protrusion 30C of the engaging member 30 engages the engaging recess 15E along the Z axis direction from the front side of the engaging section 15E (see the dotted line in FIG. 16). This causes the engaging member 30 to engage the engaging section 15E. As shown in FIG. 17, when the engaging member 30 engages the engaging section 15E, the projection 30B of the engaging member 30 abuts the sheet surface around the opening 18A1 in the tab 18A. This results in the tab 18A between sandwiched and held between the tab receiving portion 15A3 of the frame 15 and the projection 30B of the engaging member 30. In other words, in FIG. 10, of the tabs 18A of the optical sheets 18, the tabs 18A in the center area CE are held by the engaging member 30.

Figure 12:
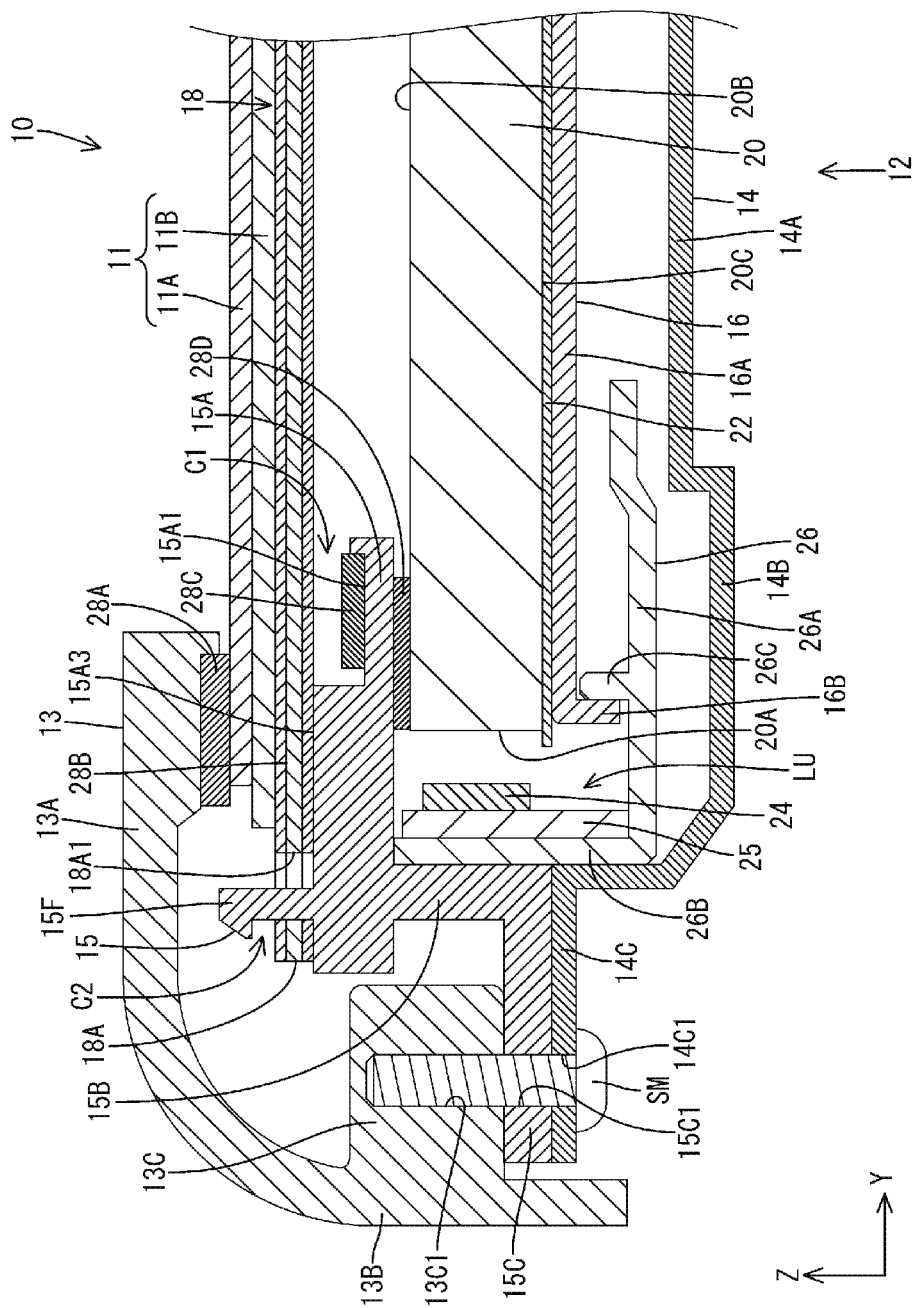
FIG. 12 is a cross-sectional view of the liquid crystal display device cut along a widthwise direction thereof and passing through a claw-shaped part on both ends where the edge of the optical sheets is arranged.
Figure 18:
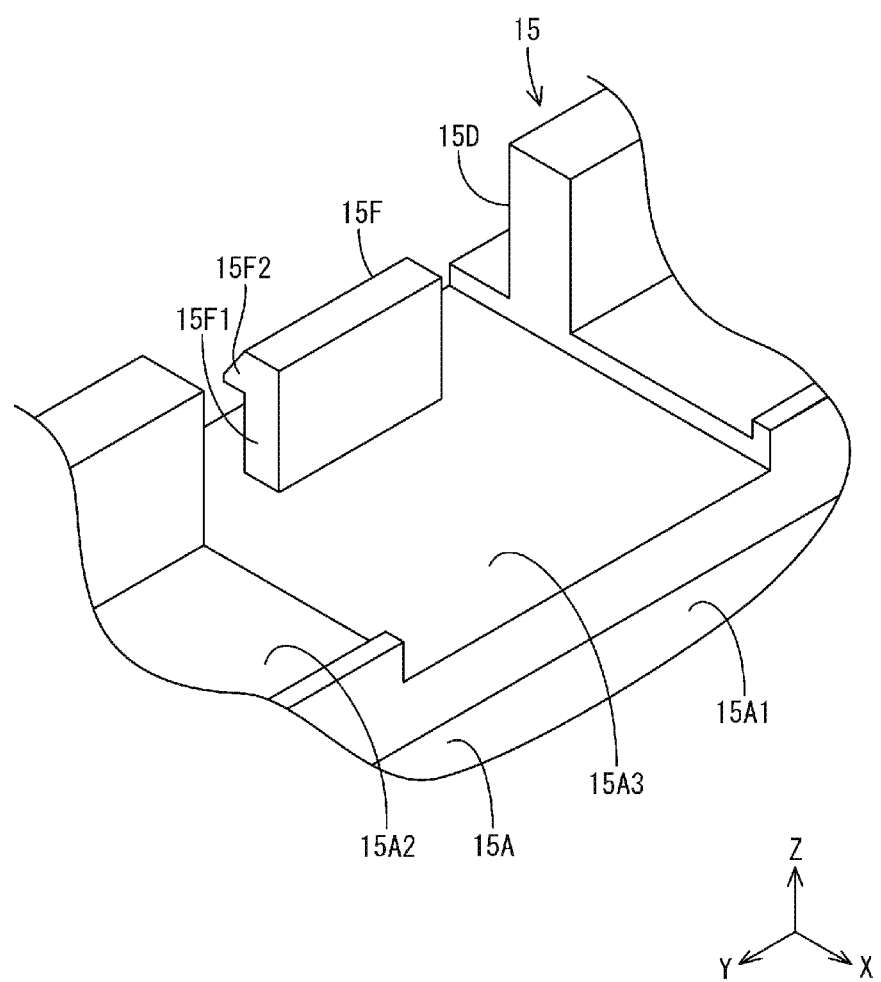
FIG. 18 is a perspective view of an attachment aspect of the optical sheets with respect to the claw-shaped part.

Next, the tabs 18A positioned in the end areas EE will be described. As shown in FIGS. 12 and 18, the tab receiving portions 15A3 positioned in the end area overlapping sections of the sheet receiving portion 15A1 of the frame 15 have locking parts 15F that protrude from the tab receiving portions 15A3 to the front side (the optical sheet 18 side). The size of the peripheral surface of the locking part 15F is slightly smaller than the opening 18A1 in the tab 18A of the optical sheets 18, and the locking part 15F can be inserted inside the opening 18A1. The locking part 15F is constituted by a main body 15F1 that extends in a straight line from the tab receiving portion 15A3 to the front, and a claw-shaped part 15F2 that lightly protrudes outward in a claw-like shape from the tip of the main body 15F1. Of these, the length that the main body 15F1 extends is greater than the thickness of the optical sheets 18.

Figure 19:
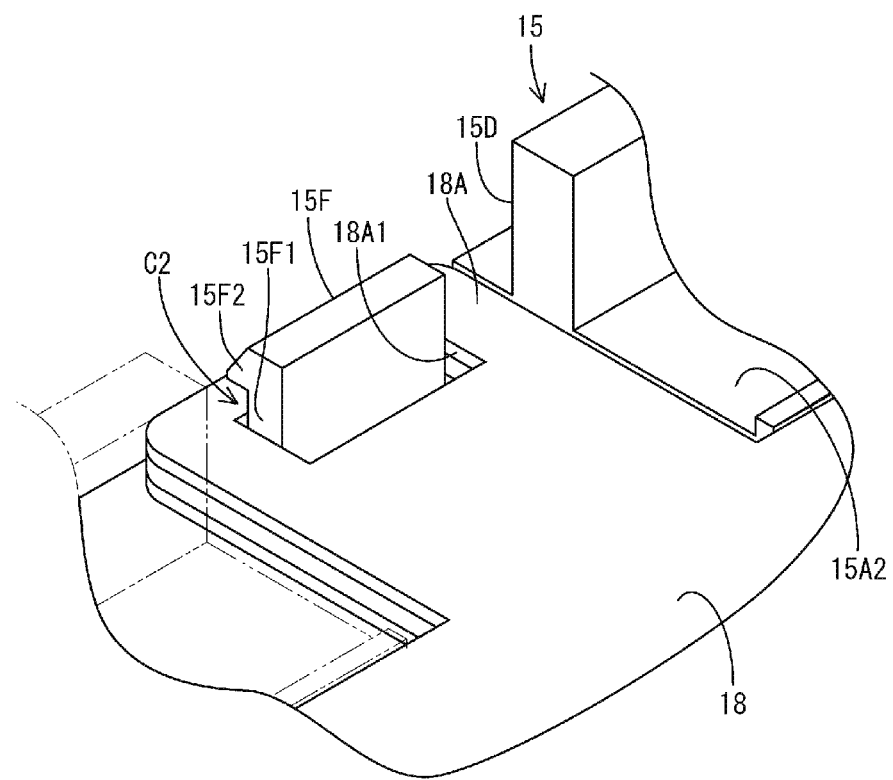
FIG. 19 is a perspective view of an attachment aspect of the optical sheets with respect to the claw-shaped part.
Figure 20:
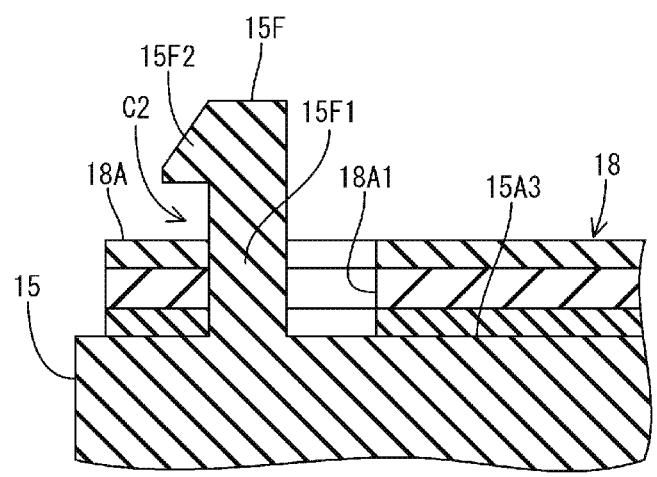
FIG. 20 is a cross-sectional view of the claw-shaped part to which the optical sheets are attached.
Figure 20:
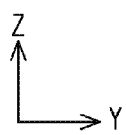

When the tabs 18A positioned in the end areas EE of the optical sheets 18 are attached to the tab receiving portions 15A3 where the locking parts 15F are provided, as shown in FIGS. 18 and 19, the locking parts 15F are inserted into the respective openings 18A1 in the tabs 18A. At such time, the position of the optical sheets 18 in the sheet surface direction (X-Y planar direction) is determined by the peripheral surface of the engaging section 15E abutting the edges of the opening 18A1, which also locks the optical sheets 18. As shown in FIGS. 12 and 20, while the locking part 15F is inserted into the opening 18A1 in the tab 18A, the claw-shaped part 15F2 of the locking part 15F is positioned higher than the sheet surface around the opening 18A1 in the tab 18A, and a prescribed clearance C2 is provided between the sheet surface and the claw-shaped part 15F2. Accordingly, the tabs 18A positioned in the end areas EE of the optical sheets 18 are locked to the locking parts 15F and can move in the thickness direction of the optical sheets 18 (the Z axis direction), and are not held by other members. In this manner, the tabs 18A positioned in the end areas EE of the optical sheets 18 are locked by the locking parts 15F provided on the tab receiving portions 15A3, but are not held, and thus are allowed to deflect in the thickness direction (Z axis direction).

In the backlight device 12 of the present embodiment, areas on the edges on the long sides of the optical sheets 18 in the center areas CE are sandwiched between the frame 15 and the liquid crystal panel 11 and held to the frame 15 by the engaging member 30, thereby effectively holding the optical sheets 18. Thus, even if vibrations are imparted to the backlight device 12, positional deviation of the optical sheets 18 can be prevented or suppressed, and the liquid crystal panel 11 stacked with the optical sheets 18 can be prevented from rubbing together with the optical sheets 18. Meanwhile, areas on the lengthwise edges of the optical sheets 18 in the end areas EE are not held; thus, even if the surface of the optical sheets 18 deflect due to heat or the like, this deflection can be eliminated the portions that are not held, which can prevent or suppress wrinkling of the optical sheets 18.

In the backlight device 12 of the present embodiment as described above, at both lengthwise ends of the optical sheets 18, areas that are closer to the center area CE than the end areas EE are selectively sandwiched between the liquid crystal panel 11 and the inner frame portion 15A of the frame 15. This holds the lengthwise edges of the optical sheets 18 at these sandwiched areas, which can prevent or suppress positional deviations of the optical sheets 18. Meanwhile, the areas on the edges of the optical sheets 18 other than the sandwiched areas are not sandwiched or held between the liquid crystal panel 11 and the frame 15. Therefore, deflections that occur in areas in the center of the surface of the optical sheets 18 or center areas CE at the edges of the optical sheets 18 can be eliminated at the non-held areas, or in other words, at the end areas EE, which can prevent or suppress wrinkling of the optical sheets 18. As described above, in the backlight device 12 of the present embodiment, wrinkling of the optical sheets 18 can be prevented or suppressed, and positional deviations of the optical sheets 18 can be prevented or suppressed.

Furthermore, in the present embodiment, only the lengthwise edges of the optical sheets 18 are sandwiched and held between the frame 15 and the liquid crystal panel 11. With this configuration, on the surface of the optical sheets 18, all areas other than the edges held between the liquid crystal panel 11 and the frame 15 can eliminate deflection on the optical sheets 18; therefore, this facilitates elimination of deflection that occurs on the sheet surface.

Moreover, in the present embodiment, engaging sections 15E are provided on tab receiving portions 15A3 that are positioned in center area overlapping sections in the inner frame portion 15A of the frame 15. An engaging member 30 is also provided which, by engaging the engaging sections 15E, holds to the engaging section 15E the areas of the edge of the optical sheets 18 positioned further outward than those sandwiched between the liquid crystal panel 11 and the frame 15. With this configuration, of the edges of the optical sheets 18, a portion of the areas positioned outside those areas sandwiched by the liquid crystal panel 11 and the frame 15 can be sandwiched and held between the engaging section 15E provided on the frame 15 and the engaging member 30. Therefore, the optical sheets 18 can be effectively held, which can further enhance the prevention or suppression of positional deviations of the optical sheets 18.

In the present embodiment, the engaging section 15E provides from the frame 15 towards the optical sheet 18. Furthermore, the optical sheets 18 have openings 18A1 in areas positioned outside the areas held between the liquid crystal panel 11 and the frame 15. The engaging sections 15E are inserted into these openings 18A1. With this configuration, the engaging sections 15E are inserted into the openings 18A1 in the optical sheets 18 and the edges of the openings abut the peripheral surfaces of the engaging sections 15E, thereby positioning the optical sheets 18 in the sheet surface direction with respect to the frame 18.

In addition, in the present embodiment, the optical sheets 18 have tabs 18A extending from the edges of the optical sheets towards the outside. Openings 18A1 are provided in these tabs 18A. With this configuration, the areas of the frame 15 on both sides of areas overlapping the tabs 18A do not overlap the optical sheets 18; thus, it is possible to provide a cabinet support portion 15D at the area not overlapping on the frame 15. This allows for the frame region of the backlight device 12 to be narrowed more than if the cabinet support portion 15D were provided more outside the areas of the frame 15 overlapping the tabs 18A.

Furthermore, in the present embodiment, the engaging member 30 engages the engaging section 15E due to the engaging member 30 having a protrusion and the engaging section 15E having a recess that receives this protrusion. With this configuration, while the engaging section 15E is inserted into the opening 18A1 in the tab 18A to position the optical sheets 18 in the surface direction thereof with the peripheral surface of the engaging section 15E, the engaging member 30 can engage the engaging section 15E. Therefore, the engaging member 30 can easily engage the engaging section 15E.

In addition, in the present embodiment, claw-shaped engaging parts 15F are provided on a part of the frame 15 and protrude from the frame 15 towards the optical sheets 18. In the optical sheets 18, the tabs 18A and the openings 18A1 in the tabs 18A are provided in the center areas CE and the end areas EE on the edges. The optical sheets 18 are arranged such that the locking parts 15F of the frame 15 are inserted into the openings 18A1 in the tabs 18A that are positioned in the end areas EE and so as to be slidable in the thickness direction of the optical sheets 18 with respect to the locking parts 15F. Thus, while the locking parts 15F are inserted into the openings 18A1, the edges of the openings abut the peripheral surface of the locking parts 15F, thereby positioning the optical sheets 18 in the surface direction thereof with respect to the frame 15. Moreover, by inserting the locking parts 15F into the openings 18A1, the optical sheets 18 are locked so as to be slidable in the thickness direction of the optical sheets 18; therefore, the optical sheets 18 are allowed to deflect at the locked areas, and thus the deflection can be eliminated. In this manner, at the areas on the edges of the optical sheets 18 locked by the locking parts 15F, deflection of the optical sheets 18 can be eliminated and the optical sheets 18 can be positioned.

Furthermore, the present embodiment includes a heat-dissipating member 26 that is disposed on the side opposite to the frame 15 across the LEDs 24 and that supports the LEDs 24 via the LED substrates 25. With this configuration, a large portion of the heat generated by the LEDs 24 will be transmitted towards the heat-dissipating member 26 provided on the side opposite to the frame 15 that holds the optical sheets 18 against the liquid crystal panel 11; therefore, it is possible to prevent heat from being transmitted to the optical sheets 18. This makes it possible to suppress deflection of the optical sheets 18 caused by heat.

Moreover, the present embodiment includes a chassis 16 having a plate-shaped portion 16A along the surface of the optical sheets 18, and a bent portion 16B that bends from the periphery of the plate-shaped portion 16A towards the heat-dissipating member 26, thereby abutting the protrusion 26C, which is part of the heat-dissipating member. Thus, the protrusion 26C of the heat-dissipating member 26 abutting the bent portion 16B can position the heat-dissipating member 26 in the surface direction (X-Y planar direction) of the plate-shaped portion 16A of the chassis 16. In addition, a portion of the heat generated by the LEDs 24 is transmitted to the heat-dissipating member 26 via the chassis 16; thus, this further enhances suppression of heat being transmitted to the optical sheets 18.

Furthermore, in the present embodiment, the frame 15 is made of a synthetic resin. Therefore, it is harder for heat to be transmitted to the optical sheets 18 via the frame 15 than if the frame 15 were made of metal.

Modification Example 1 of Embodiment 1

Modification Example 1 of Embodiment 1 will be explained with reference to FIGS. 21 and 12. Parts in FIGS. 21 and 22 that have 100 added to the reference characters of FIGS. 6 and 8 are the same as these parts described in Embodiment 1. Modification Example 1 differs from Embodiment 1 in the support aspect of the edges of optical sheets 118 on a sheet receiving portion 115A1 of a frame 115.

Figure 21:
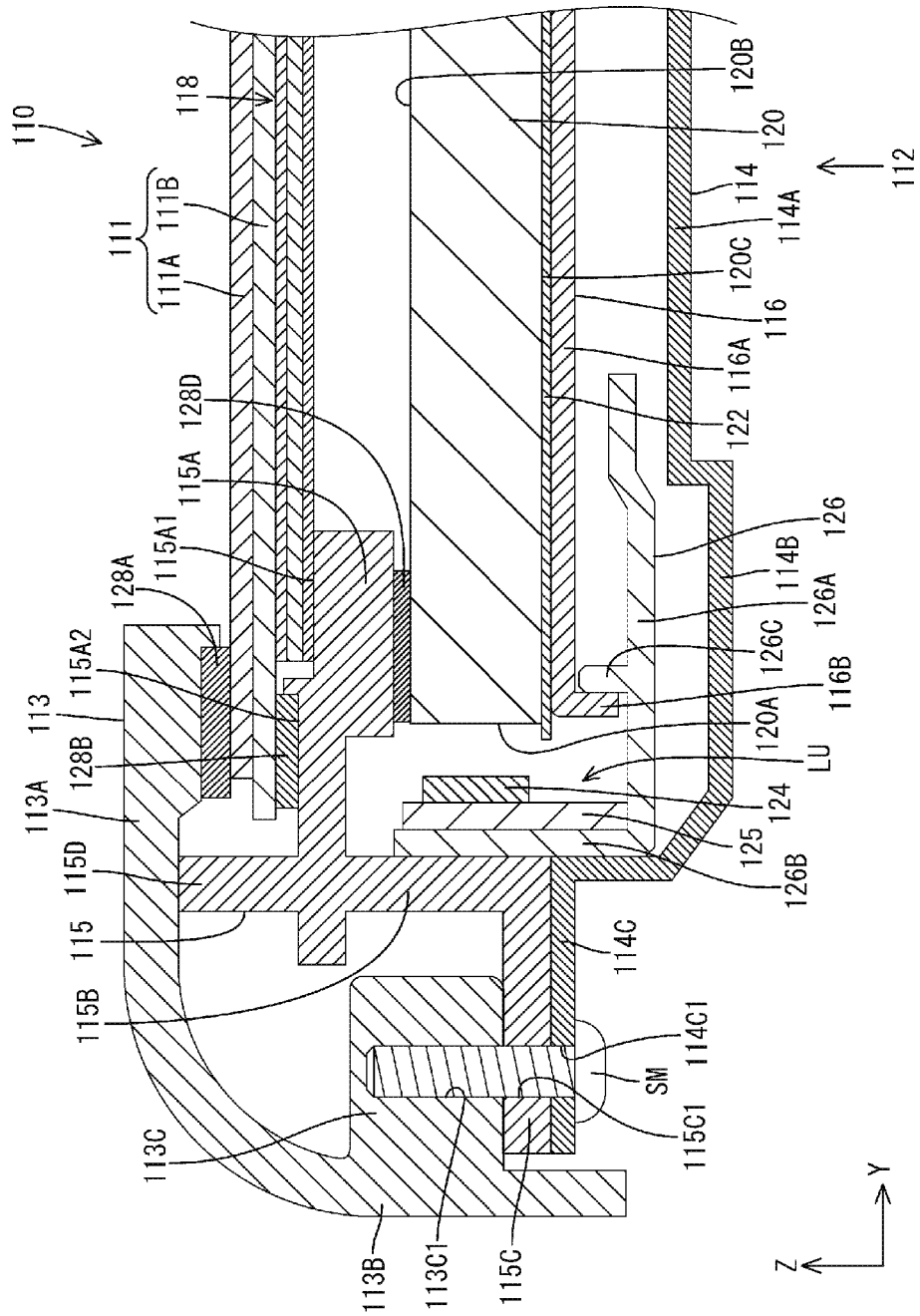
FIG. 21 is a cross-sectional view of the liquid crystal display device cut along the widthwise direction thereof in a center area where the edge of the optical sheets is arranged in Modification Example 1 of Embodiment 1.
Figure 22:
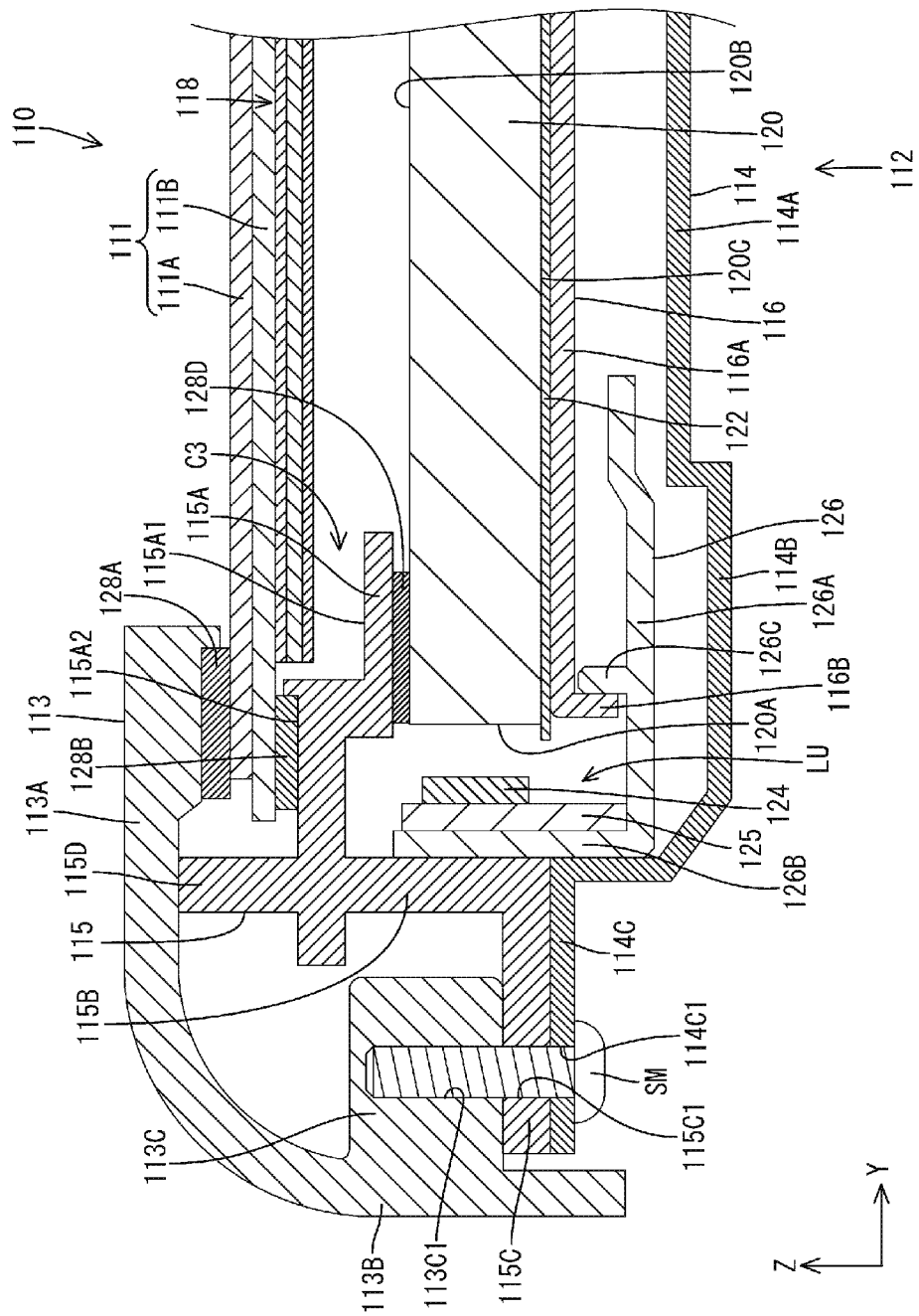
FIG. 22 is a cross-sectional view of the liquid crystal display device cut along the widthwise direction thereof on both ends where the edge of the optical sheets is arranged in Modification Example 1 of Embodiment 1.

As shown in FIGS. 21 and 22, in Modification Example 1, a cushioning member is not provided on the sheet receiving portion 115A1 of the frame 115. Therefore, as shown in FIG. 21, in the center area overlapping section of the sheet receiving portion 115A1 of the frame 115, the sheet receiving section 115A1 directly presses on the edges of the optical sheets 118 while holding the edges to the edges of the liquid crystal panel 111. Due to this, the portions of the center areas of the edges of the optical sheets 118 where the tabs are provided are sandwiched and held between the frame 115 and the liquid crystal panel 111. Meanwhile, as shown in FIG. 22, in the end area overlapping sections of the sheet receiving portion 115A1 of the frame 115, the sheet receiving portion 115A1 is separated from the edges of the optical sheets 118 and a prescribed clearance C3 is provided therebetween. Of the edges where the tabs of the optical sheets 118 are provided, the portions in the end areas are not held by other members. In this manner, even if the edges of the optical sheets 118 are held to other members without a cushioning member therebetween, it is possible to prevent or suppress wrinkling of the optical sheets 118 while preventing or suppressing positional deviations of the optical sheets 118.

Modification Example 2 of Embodiment 1

Next, Modification Example 2 of Embodiment 1 will be explained with reference to FIGS. 23 and 24. Parts in FIGS. 23 and 24 that have 200 added to the reference characters of FIGS. 16 and 17 are the same as these parts described in Embodiment 1. Modification Example 2 differs from Modification Example 1 in the engaging aspect of the engaging member 230 to the engaging section 215E provided on the frame 215.

Figure 23:
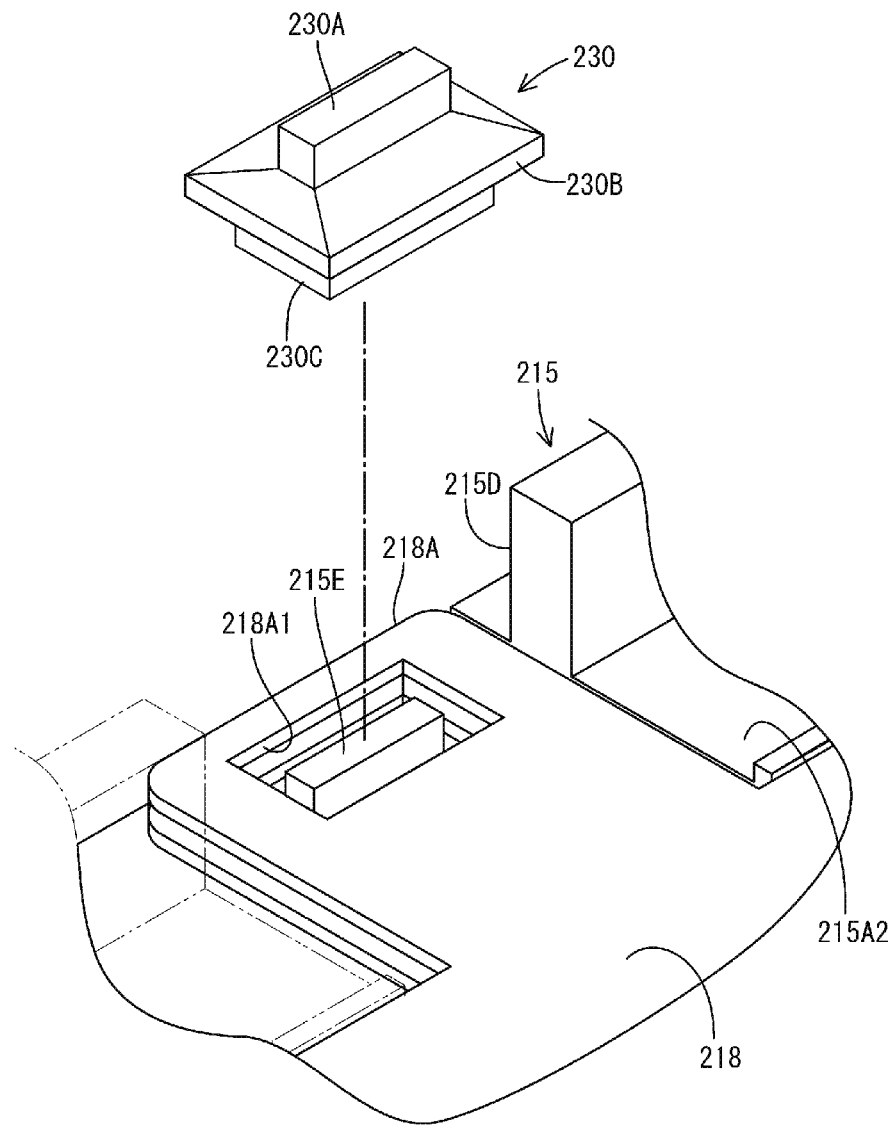
FIG. 23 is a perspective view of an attachment aspect of an engaging member and the optical sheets with respect to the engaging section in Modification Example 2 of Embodiment 1.
Figure 23:
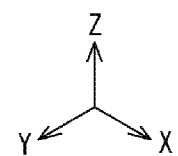
Figure 24:
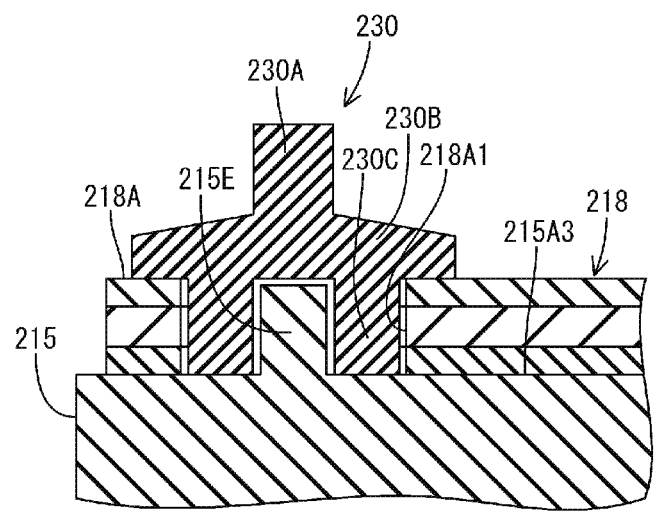
FIG. 24 is a cross-sectional view of an attachment aspect of an engaging member and the optical sheets with respect to the engaging section in Modification Example 2 of Embodiment 1.

As shown in FIGS. 23 and 24, in Modification Example 2, the recess and protrusion of the engaging section 215E and the engaging member 230 are the opposite of Embodiment 1. In other words, the rear protrusion 230C in the engaging member 230 has an engaging recess, and the engaging section 215E protrudes towards the front from the tab receiving portion 215A3 at a size that allows the engaging section 215E to be housed within this engaging recess.

With this configuration, when attaching the tabs 218A positioned in the center areas on the optical sheets 218 to the tab receiving portions 215A3 where the engaging sections 215E are disposed, first, the engaging sections 215E are inserted into the openings 218A1 in the tabs 218A. Furthermore, the engaging recess in the rear protrusion 230C of the engaging member 230 engages the engaging section 215E due to the engaging member 230 having the recess and the engaging section 215E having the protrusion. Even with this configuration, the engaging member 230 engaging the engaging recess of the engaging section 215E causes the projection 230B of the engaging member 230 to abut the sheet surface around the opening 218A1 in the tab 218A, as shown in FIG. 24. Thus, the tab 218A can be sandwiched and held between the tab receiving portion 215A3 of the frame 215 and the projection 230B of the engaging member 230.

Embodiment 2

Embodiment 2 will be described with reference to the drawings. Embodiment 2 differs from Embodiment 1 in the placement of the tabs in the optical sheets and the holding aspect of the optical sheets. Other configurations are similar to those of Embodiment 1; thus, the descriptions of the configurations, operation, and effects are omitted. Parts in FIG. 25 that have 300 added to the reference characters of FIG. 10 are the same as these parts described in Embodiment 1.

Figure 25:
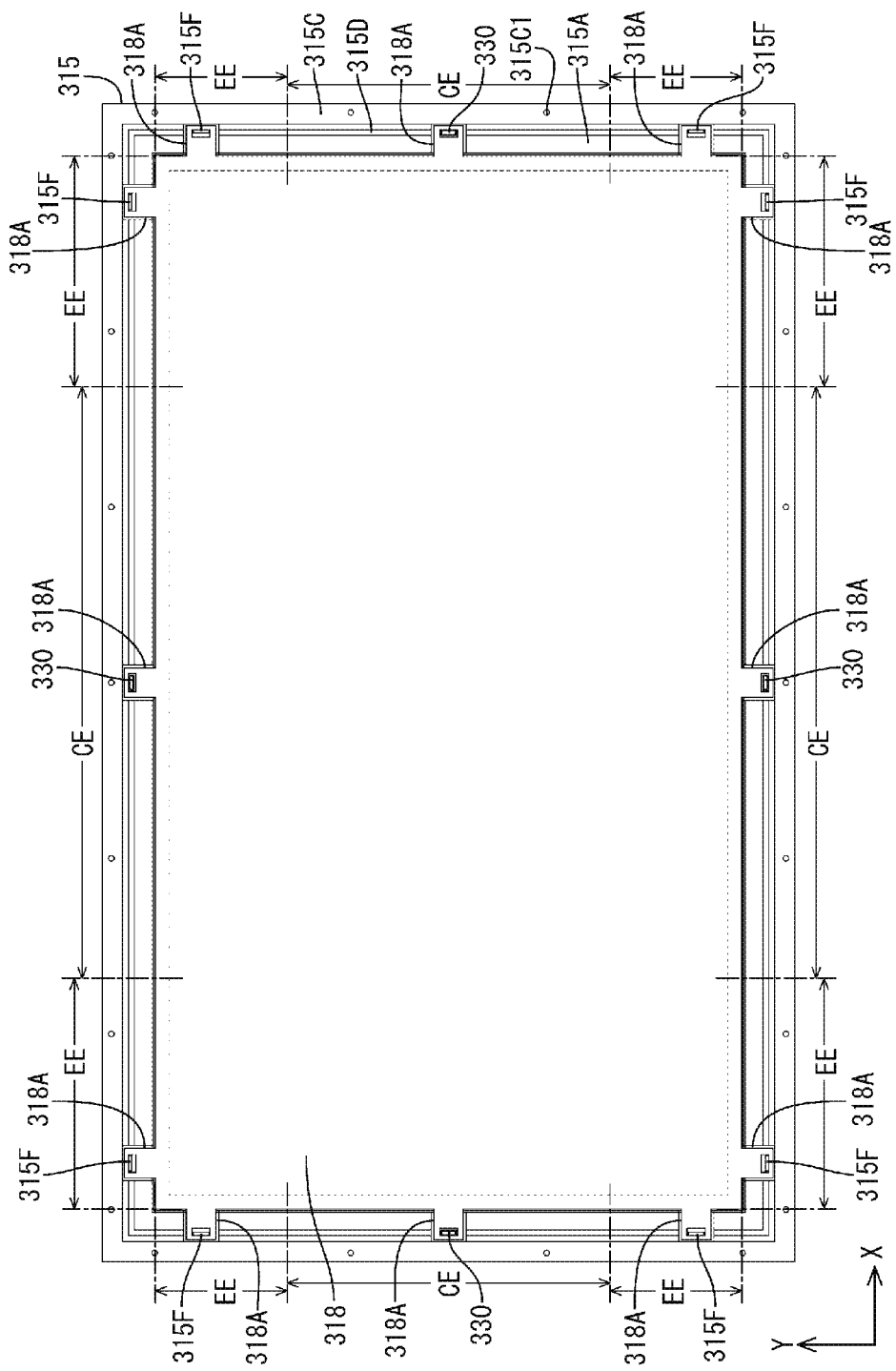
FIG. 25 is a plan view as seen from the front of the frame on which the edge of the optical sheets is arranged in Embodiment 2.

The backlight device of Embodiment 2 is for use with digital signage and the like and is characteristically arranged in various orientations (vertically, horizontally, etc). Thus, all of the edges of the optical sheets 318 that form a portion of the backlight device of the present embodiment are supported with respect to the frame 315. As shown in FIG. 25, three tabs 318A each are provided in each edge of the optical sheets 318. In each edge of the optical sheets 318, the three tabs 318A are arranged with approximately equal gaps therebetween. In addition, the tabs 318A are provided so as to be symmetrical to each other among pairs of the tabs that face each other across the optical sheets 318. In each edge of the optical sheets 318, one tab is provided in the center area CE and two tabs are provided in the end areas EE.

The area of each edge of the optical sheets 318 in the center area CE is sandwiched and held between the frame 315 and the liquid crystal panel, in a similar manner to the sandwiching aspect of Embodiment 1. Meanwhile, the area of each edge of the optical sheets 318 in the end areas EE is separated from the frame 315 and not held by other members, in a similar manner to Embodiment 1. Moreover, in each edge of the optical sheets 318, the tab 318A positioned in the center area CE is held by the engaging member 330, in a similar manner to Embodiment 1. In each edge of the optical sheets 318, the tabs 318A positioned in the end areas EE are locked by the respective locking parts 315F provided on the tab receiving portion, but are not held, and thus are allowed to deflect in the thickness direction thereof (the Z axis direction), in a similar manner to Embodiment 1. Thus, in the present embodiment, each edge of the optical sheets 318 can be selectively held while preventing or suppressing wrinkling of the optical sheets 318 and preventing or suppressing positional deviations of the optical sheets 318.

Embodiment 3

Figure 26:
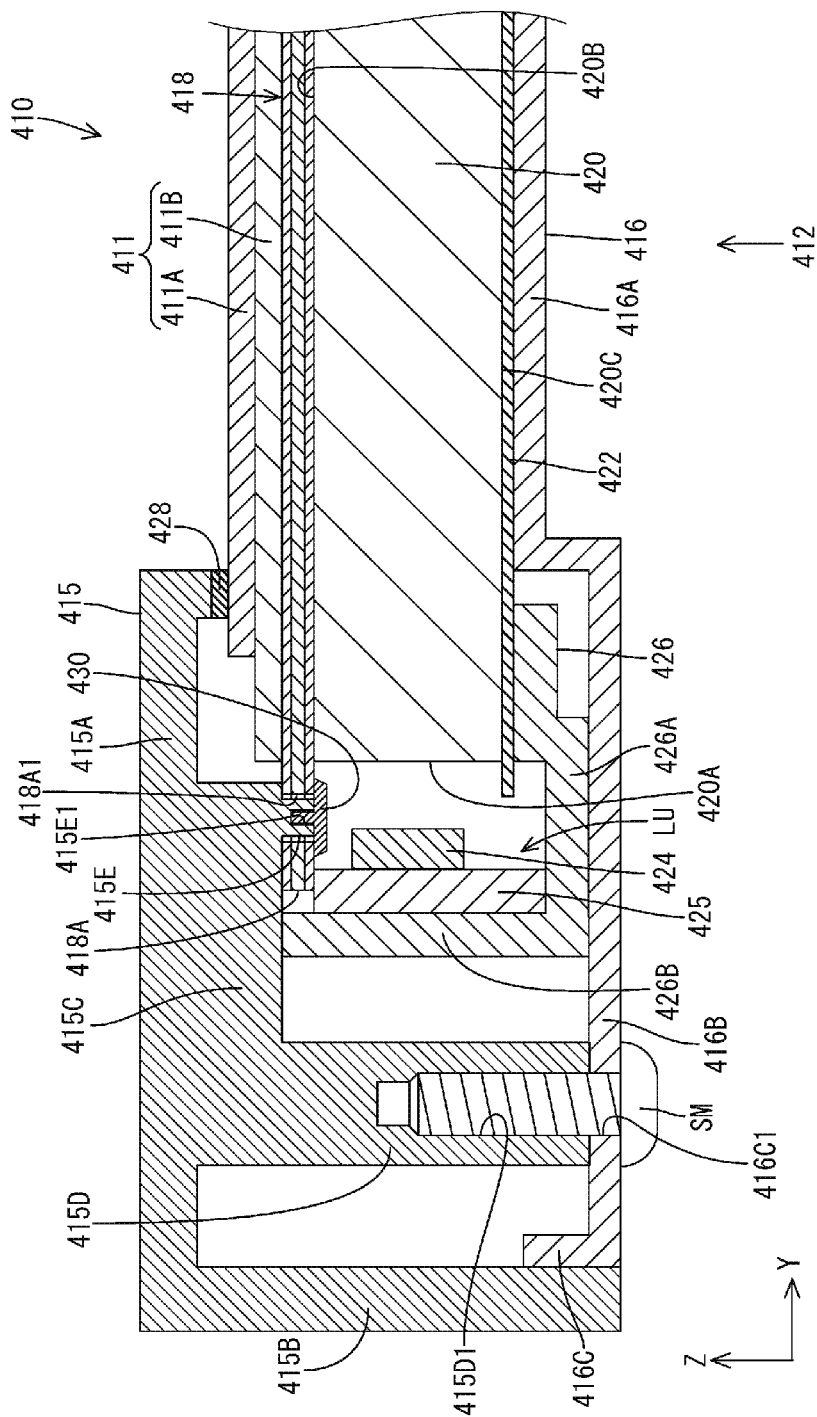
FIG. 26 is a cross-sectional view of the liquid crystal display device cut along a widthwise direction thereof and passing through an engaging pin in the center area where the edge of the optical sheets is arranged in Embodiment 3.
Figure 27:
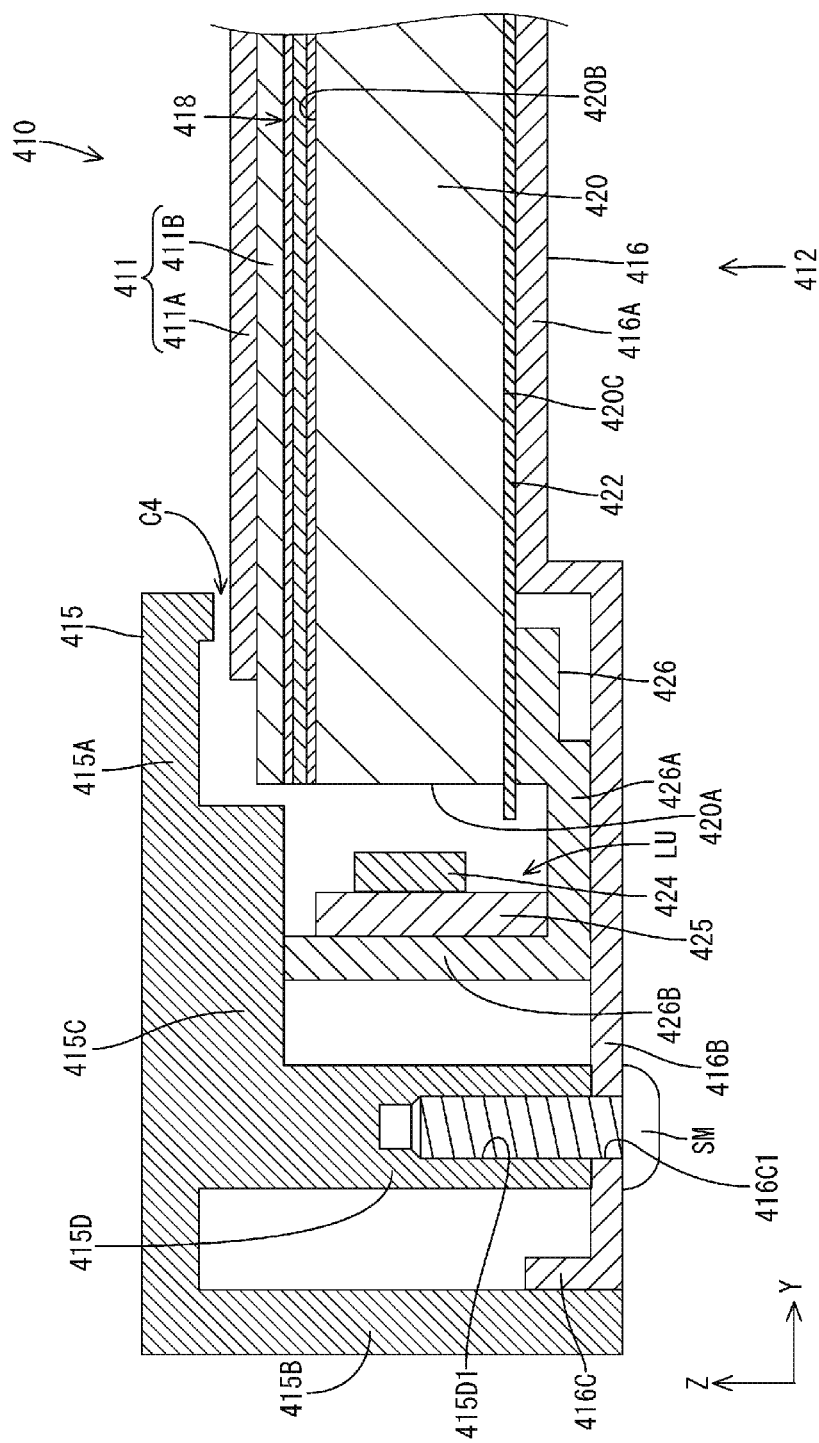
FIG. 27 is a cross-sectional view of the liquid crystal display device cut along the widthwise direction thereof on both ends where the edge of the optical sheets is arranged in Embodiment 3.

Embodiment 3 will be described with reference to the drawings. Embodiment 3 differs from Embodiment 1 in that a liquid crystal display device 410 does not have a cabinet, and in the sandwiching aspect of the edges of the optical sheets 418. The portion of the liquid crystal display device 410 of Embodiment 3 without the liquid crystal panel 411 is the backlight device 412. As shown in FIGS. 26 and 27, the main components of this backlight device 412 are housed in a space between a frame (one example of a frame member) 415 that forms the front exterior and a chassis 416 that forms the rear exterior.

The main components housed between the frame 415 and the chassis 416 include at least the liquid crystal panel 411, optical member 418, light guide plate 420, LED units LU, and heat-dissipating members 426. Of these, the liquid crystal panel 411, optical member 418, and light guide plate (one example of a laminated member (optical component)) 420 are sandwiched between the front frame 415 and the rear chassis 416 while being stacked on one another, which is different from Embodiment 1. In the backlight device 412, the configurations of the liquid crystal panel 411, LEDs 424, LED substrates 425, and light guide plate 420 are the same as in Embodiment 1, and thus repetitive explanations will be omitted.

The chassis 416 includes a bottom plate 416A having a plate shape and a pair of LED housing members 416B that each protrude in a step-wise manner to the rear from both lengthwise ends of the bottom plate 416A and that house the LED units LU, and a positioning member 416C that rises slightly to the front side from the outer edge of the LED housing member 416B.

The heat-dissipating members 426 that form a portion of the respective LED units LU are each constituted by a heat-dissipating portion 426A that extends in a plate shape along the surface direction (X-Y planar direction) of the light guide plate 420, and a rising portion 426B that rises from the outer edge area of the heat-dissipating portion 426B to the front side. Of these, the heat-dissipating portion 426A makes surface-to-surface contact with the LED housing member 416B of the chassis 416 and supports the opposite surface 420C of the light guide plate 420 via the reflective sheet 422. The optical sheets 418 have tabs 418A in both lengthwise edges thereof. These tabs 418A differ from Embodiment 1 in being provided only in the center area on the edges of the optical sheets 418.

The frame 415 is a horizontally-long frame shape as a whole and encloses the display area on the display surface of the liquid crystal panel 411. The frame 415 is constituted by a panel pressing portion 415A that runs parallel to the display surface of the liquid crystal panel 411 and that presses the liquid crystal panel 411 from the front side, and side walls 415B that protrude from the peripheral portion of the panel pressing portion 415A towards the rear side. The frame 415 has approximately an "L" shape in a cross-sectional view. The side walls 415B are substantially cylindrical-shaped and protrude from the peripheral portion (specifically, the peripheral edges) of the panel pressing portion 415A toward the rear side. The side walls 415B can enclose the liquid crystal panel 411, the optical member 418, the light guide plate 420, and the LED units LU that are housed therein along the entire periphery thereof, and also can enclose the chassis 416 on the rear side along almost the entire periphery thereof. The inner surface of the tip of the side walls 415b abut the positioning member 416C of the chassis 416, thereby positioning the frame 415 in the surface direction (the X-Y) planar direction of the light guide plate 420.

As shown in FIGS. 26 and 27, a pressing projection is integrally formed on the inner edge of the panel pressing portion 415A and protrudes towards the rear side, or namely, towards the liquid crystal panel 411. The portion of the protruding tip end face of this pressing projection that overlaps the center area on the lengthwise edges of the optical sheets 418 has a cushioning member 428 attached thereto (see FIG. 26), and the liquid crystal panel 411 and the edges of the optical sheets 418 can be pressed via this cushioning member 428 from the front. Meanwhile, the portion of the protruding tip end face of this pressing projection that overlaps the end areas on lengthwise edges of the optical sheets 418 does not have the cushioning member 428 attached thereto (see FIG. 27), and a prescribed clearance C4 is provided between the pressing projection and the liquid crystal panel 411.

A rib 415C is provided at a position more inward (towards the light guide plate 420) than the side walls 415B of the panel pressing portion 415A, and this rib protrudes towards the rear side and abuts the front tips of the rising portion 426B of the heat-dissipating member 426. The portion of the ribs 415C overlapping the center area on the lengthwise edges of the optical sheets 418 has an engaging section 415E that protrudes towards the rear side. The configuration of this engaging section 415E is similar to the configuration of the engaging section 15E in Embodiment 1 but with the front and rear sides reversed. This engaging section 415E engages the engaging member 430 by being inserted into the opening 418A1 in the tabs 418A in the optical sheets 418. The configuration of this engaging member 430 is similar to the engaging member 30 of Embodiment 1.

A portion of the rib 415C has a screw attachment portion 415D that extends further to the rear side from the rib 415C and thus the tip of the screw attachment part abuts the LED housing member 416B of the chassis 416. The screw attachment portion 415D can hold the chassis 416 by the screw SM attached to the chassis 416 from the rear side. Furthermore, the screw attachment portion 415D has a screw hole 415D1 formed therein that opens towards the rear side and that can fasten the screw SM. The LED housing member 416B of the chassis 416 has a chassis screw insertion hole 416C1 in which the screw SM can be inserted.

As described above, in the present embodiment, the area on the center areas on both lengthwise edges of the optical sheets 418 is sandwiched and held between the pressing projections of the frame 415 and the light guide plate 420. Meanwhile, in the area on the end areas on both lengthwise edges of the optical sheets 418, the pressing projections of the frame 415 are separated from the liquid crystal panel 411 and not held by other members. Moreover, the tabs 418A in the center area on both lengthwise edges of the optical sheets 418 are held by the engaging member 430, in a similar manner to Embodiment 1. On the other hand, the end areas on both lengthwise edges of the optical sheets 418 do not have the tabs 418A, and thus are not held by other members and can deflect in the thickness direction thereof (the Z axis direction). Thus, in the present embodiment, each edge of the optical sheets 418 can be selectively held while preventing or suppressing wrinkling of the optical sheets 418 and preventing or suppressing positional deviations of the optical sheets 418.

Modification examples of the respective embodiments mentioned above are described below.

(1) In the respective embodiments above, an example was shown in which at least one edge of the optical sheets is selectively sandwiched between the frame and the liquid crystal panel or the frame and the light guide plate, but the members that selectively sandwich at least one edge of the optical sheets are not limited to this.

(2) In the respective embodiments above, an example was shown in which, with respect to at least one edge of the optical sheets, the area outside the portion being held by another member was held to the frame by the engaging member, but at least one edge of the optical sheet may be selectively held, and the area outside the portion being held does not need to be held by another member.

(3) In the respective embodiments above, an example was shown in which tabs are provided in at least one edge of the optical sheets, but tabs do not necessarily need to be provided in the optical sheets.

(4) In addition to the respective embodiments described above, it is possible to appropriately modify the respective areas occupied by the center areas and the end areas for at least one edge of the optical sheets.

(5) In addition to the respective embodiments described above, it is possible to appropriately modify the sandwiching aspect in which at least one edge of the optical sheets is held by being selectively sandwiched.

(6) In addition to the respective embodiments described above, it is possible to appropriately modify the configuration of the engaging section and the locking part provided on the frame member.

(7) In addition to the respective embodiments described above, it is possible to appropriately modify the configuration of the engaging member.

(8) In the respective embodiments described above, an example was shown in which an edge-lit backlight device was used, but a direct-lit backlight device can also be used in the present invention.

(9) In the respective embodiments described above, an example was shown in which a liquid crystal display device using liquid crystal panel is used as a display panel, but the present invention is also applicable to a display device that uses another type of display panel.

(10) In the respective embodiments above, an example was shown in which a television receiver that includes a tuner was used, but the present invention is also applicable to a display device without a tuner.

The embodiments of the present invention were described above in detail, but these are only examples, and do not limit the scope as defined by the claims. The technical scope defined by the claims includes various modifications of the specific examples described above.

DESCRIPTION OF REFERENCE CHARACTERS

TV television receiver
Ca, Cb cabinet
T tuner
S stand
10, 110, 410 liquid crystal display device
11, 111, 411 liquid crystal panel
12, 112, 412 backlight device
15, 115, 215, 315, 415 frame
15E, 215E, 415E engaging section
15F, 215F, 315F locking part
18, 118, 218, 318, 418 optical sheet
18A, 118A, 218A, 318A, 418A tab
20, 120, 420 light guide plate
24, 124, 424 LED
30, 230, 330, 430 engaging member
CE center area
EE end area
LU LED unit

What is claimed is:

1. An illumination device, comprising:
a light source;
an optical sheet having a rectangular shape and imparting an optical effect on light from the light source;
a display component having a rectangular shape and being provided on the optical sheet; and
a frame member having a frame shape surrounding the optical sheet and, on at least one edge of the optical sheet, selectively and directly or indirectly pressing an area that is located relatively more towards a center of said edge of the optical sheet than both sides of said edge so as to secure said area to the display component,
wherein the frame member has an engaging section formed on a portion thereon,
wherein the illumination device further comprises an engaging member that fits into the engaging section so as to secure, to the engaging section, a part of an area on the edge of the optical sheet that is outside the area where the optical sheet is secured to the display component,
wherein the engaging section protrudes from the frame member toward the optical sheet,
wherein the optical sheet has at least one opening in the area of the edge of the optical sheet that is outside the area where the optical sheet is secured to the display component by the frame member, the engaging section penetrating through said opening in the optical sheet,
wherein the frame member further includes a claw-shaped locking part formed on a portion thereon, said locking part protruding from the frame member towards the optical sheet,
wherein there are a plurality of the openings in the optical sheet, the openings being respectively provided in the center and said both sides on the edge of the optical sheet, and
wherein, among the openings in the optical sheet, the opening provided in areas respectively closer to said both sides than the center on the edge of the optical sheet has said locking part of the frame member penetrating therethrough, thereby locking the optical sheet to the locking part such that the optical sheet is slidable in a thickness direction thereof.

2. The illumination device according to claim 1, wherein only said at least one edge of the optical sheet is held to the display component.

3. The illumination device according to claim 1,
wherein the optical sheet includes a sheet extending portion that extends outward from said edge of the optical sheet, and
wherein the opening in the optical sheet is located in the sheet extending portion.

4. The illumination device according to claim 1, wherein the engaging member has a protrusion and the engaging section has a recess to receive said protrusion.

5. The illumination device according to claim 1, further comprising a heat-dissipating member disposed between the frame member and the light source, the heat-dissipating member supporting the light source.

6. The illumination device according to claim 5, further comprising a chassis including at least a plate-shaped portion along a sheet surface of the optical sheet, and a bent portion that bends from a periphery of the plate-shaped portion towards the heat-dissipating member to abut a part of the heat-dissipating member.

7. The illumination device according to claim 1, wherein the frame member is made of a resin.

8. A display device, comprising:
the illumination device according to claim 1;
wherein the display component is a display panel that performs display using light from the illumination device.

9. The display device according to claim 8, wherein the display panel is a liquid crystal panel that uses liquid crystal.

10. A television receiver, comprising the display device according to claim 8.

11. A display device, comprising:
the illumination device according to claim 1,
wherein the display component is a light guide plate that has a light-entering face on at least one end face thereof and that guides light from the light source that has entered the light-entering face to the optical sheet, and
wherein the display device additionally includes a display panel provided on the optical sheets, said frame member pressing said area through the display panel.

12. A television receiver, comprising the display device according to claim 11.

13. The illumination device according to claim 1, wherein the frame member presses said area through a cushioning member.

* * * * *